United States Patent [19]

Sakakibara et al.

[11] Patent Number: 5,179,867
[45] Date of Patent: Jan. 19, 1993

[54] AUTOMATIC TRANSMISSION FOR VEHICLE

[75] Inventors: Shiro Sakakibara; Takeshi Inuzuka; Masashi Hattori; Hironari Fukatsu; Shinichi Takaki, all of Aichi, Japan

[73] Assignee: Aisin AW Co., Ltd., Japan

[21] Appl. No.: 628,350

[22] Filed: Dec. 17, 1990

[30] Foreign Application Priority Data

Dec. 28, 1989 [JP] Japan .................. 1-338261
Dec. 28, 1989 [JP] Japan .................. 1-338262

[51] Int. Cl.⁵ .............................. F16H 59/04
[52] U.S. Cl. .................... 74/335; 74/473 R
[58] Field of Search ............... 74/335, 473 R

[56] References Cited

U.S. PATENT DOCUMENTS

| 4,583,417 | 4/1986 | Hurlow | 74/473 R |
| 4,799,397 | 1/1989 | Egidi et al. | 74/473 R |
| 4,879,922 | 11/1989 | Suzuki | 74/473 R X |
| 4,916,964 | 4/1990 | Crack | 74/473 R X |
| 4,960,008 | 10/1990 | Yen et al. | 74/335 X |
| 5,033,324 | 7/1991 | Glaser | 74/335 X |
| 5,038,901 | 8/1991 | Parsons et al. | 74/335 X |

FOREIGN PATENT DOCUMENTS 273874  7/1988  European Pat. Off. .......... 74/473 R
60-179339  9/1985  Japan .......................... 74/473 R Primary Examiner—Dirk Wright
Attorney, Agent, or Firm—Lorusso & Loud

[57] ABSTRACT

An automatic transmission for a vehicle a shift pattern, restricting the movement of a shift lever, including at least an H-shaped portion. When the shift lever has been moved to any shift position of the pattern, a range and a gear ratio which corresponds to the shift position are selected. When the shift lever is released from the shift position in the lowest stage, the gearing is shifted to the ratio which is higher than the lowest stage by one step. When the shift lever is released from the shift position in the highest stage, the gearing is shifted to the ratio which is lower than the maximum stage by one step. When the shift lever is moved to a position intermediate the shift positions, the range and the gear ratio which correspond to the shift position before the movement can be maintained or the automatic transmission range can be established. The switching between the previous stage maintaining function and the automatic transmission drive mode selection function is made by determination of whether or not the driver is operating the shift lever.

6 Claims, 28 Drawing Sheets

FIG.10(A)
FIG.10(B)
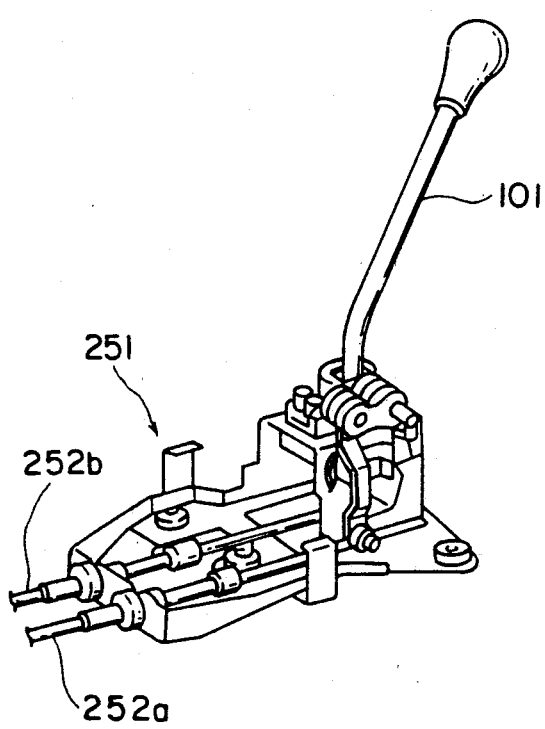
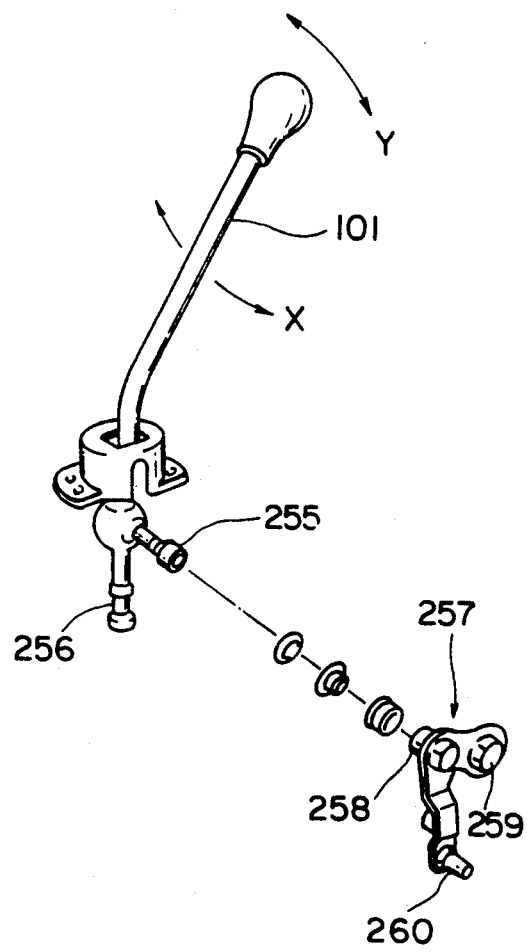

FIG. 15

| SHIFT POSITION | | SOLENOID | | | | CLUTCH | | | | BRAKE | | | | ONE-WAY CLUTCH | | | |
|---|---|---|---|---|---|---|---|---|---|---|---|---|---|---|---|---|---|
| | | S₁ | S₂ | S₃ | S₄ | C₀ | C₁ | C₂ | C₃ | B₁ | B₂ | B₃ | B₄ | F₀ | F₁ | F₂ | F₃ |
| P | | × | ○ | × | | | | | | | | | ○ | | | | |
| R | V≤7 | × | ○ | × | | | | ○ | | | | ○ | ○ | | | | |
| | V>7 | ○ | ○ | × | | | | ○ | | | | × | ○ | | | | |
| N | | × | ○ | × | | | | | | | | | ○ | | | | |
| D | 1ST | × | ○ | × | | | ○ | | | | | ○ | | | | ○ | ○ |
| | 2ND | ○ | ○ | × | ◎ | | ○ | | | ○ | ○ | | ○ | | ○ | | ○ |
| | 3RD | ○ | × | × | ◎ | | ○ | | ○ | ○ | ○ | | | | ○ | | |
| | 4TH | × | × | × | ◎ | ○ | ○ | | ○ | | ○ | | | ○ | | | |
| | 5TH | × | × | ○ | ◎ | ○ | | | ○ | ○ | ○ | | | | | | |
| | (4TH) | × | × | × | ◎ | ○ | ○ | | ○ | | ○ | | | ○ | | | |
| S | 1ST | × | ○ | × | | | ○ | | | | | ○ | | | | ○ | ○ |
| | 2ND | ○ | ○ | × | ◎ | | ○ | | | ○ | ○ | | ○ | | ○ | | ○ |
| | 3RD | ○ | × | × | ◎ | | ○ | | ○ | ○ | ○ | | | | ○ | | |
| | 4TH | × | × | × | ◎ | ○ | ○ | | ○ | | ○ | | | ○ | | | |
| | (4TH) | × | × | × | ◎ | ○ | ○ | | ○ | | ○ | | | ○ | | | |
| L | 1ST | × | ○ | × | | | ○ | | | | | ○ | ○ | | | ○ | ○ |
| | 2ND | ○ | ○ | × | | | ○ | | | ○ | ○ | | ○ | | ○ | | ○ |
| | (1ST) | × | × | × | | | ○ | | | | | ○ | ○ | | | ○ | ○ |

NOTE:
○ ON
× OFF
◎ ON: LOCKUP CLUTCH CONTROL OFF: RELEASE

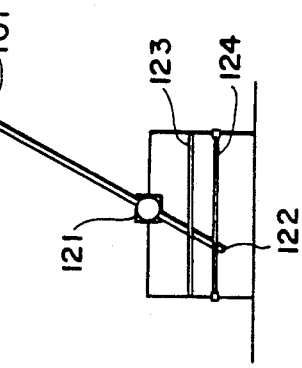
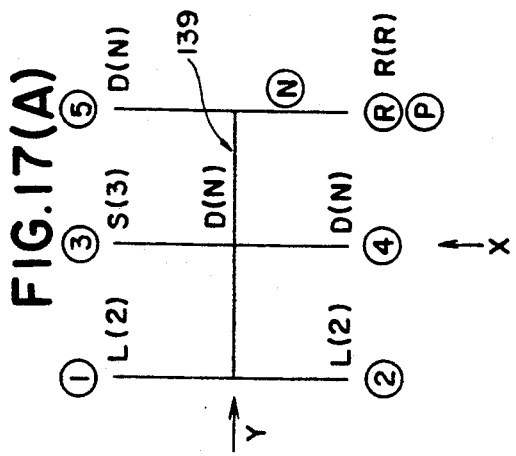
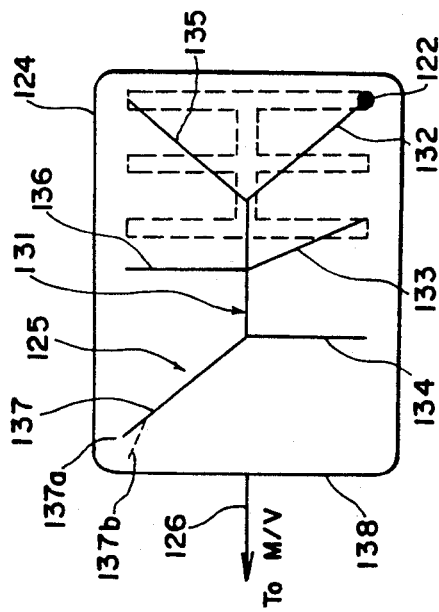
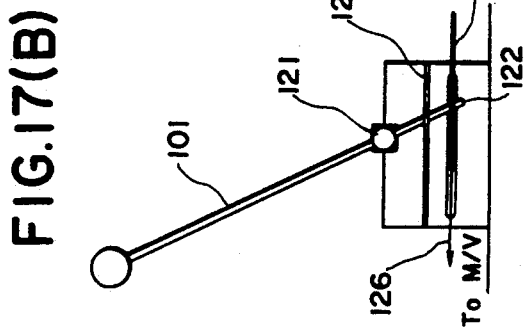

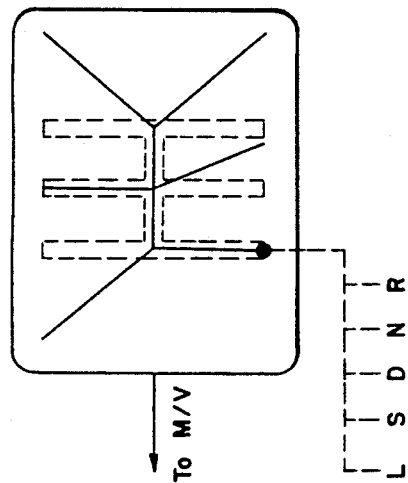
FIG.18(E) 5TH
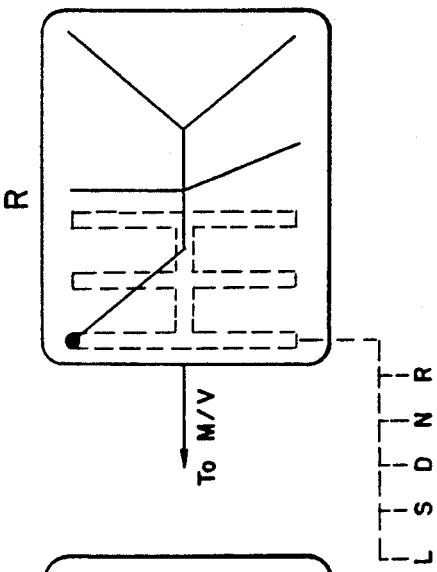
FIG.18(F) R
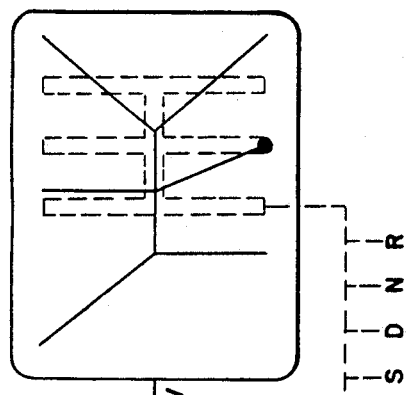
FIG.18(C) 3RD
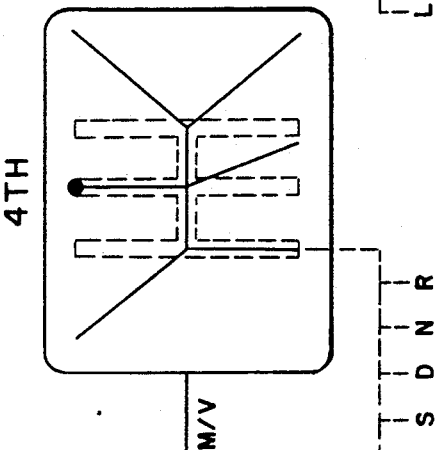
FIG.18(D) 4TH
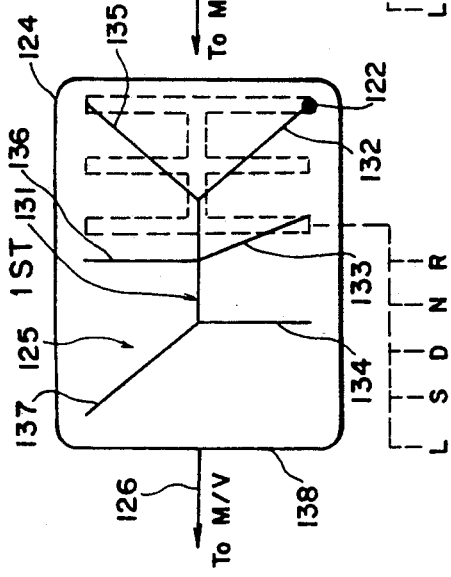
FIG.18(A)
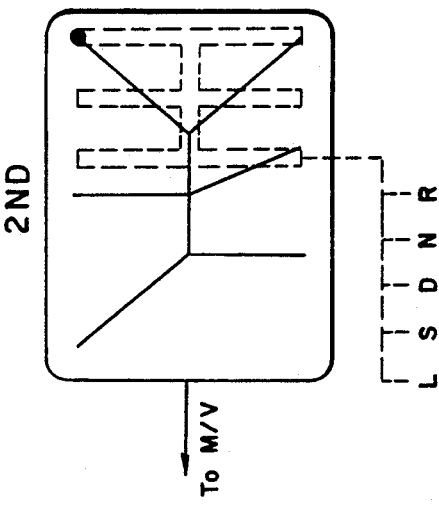
FIG.18(B) 2ND

FIG. 20

| SHIFT POSITION | | SOLENOID | | | | CLUTCH | | | | BRAKE | | | | ONE-WAY CLUTCH | | | |
|---|---|---|---|---|---|---|---|---|---|---|---|---|---|---|---|---|---|
| | | $S_1$ | $S_2$ | $S_3$ | $S_4$ | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | ○ | ○ | ○ | | | | | | | | | ○ | | | | |
| R | V≦7 | × | ○ | ○ | | | | ○ | | | | ○ | ○ | | | | |
| | V>7 | ○ | ○ | ○ | | | | ○ | | | | × | ○ | | | | |
| N | | ○ | ○ | ○ | | | | | | | | | ○ | | | | |
| D | 1ST | ○ | ○ | ○ | | | ○ | | | | | | ○ | | | ○ | ○ |
| | 2ND | × | ○ | ○ | ◎ | | ○ | | | ○ | ○ | | ○ | | ○ | | ○ |
| | 3RD | × | × | ○ | ◎ | | ○ | | ○ | ○ | | | | | ○ | | |
| | 4TH | ○ | × | ○ | ◎ | ○ | ○ | | ○ | | | | | ○ | | | |
| | 5TH | ○ | × | × | ◎ | ○ | | | ○ | ○ | ○ | | | | | | |
| | (N) | × | × | × | | | | | ○ | ○ | ○ | | | | | | |
| S | 1ST | ○ | ○ | ○ | | | ○ | | | | | | ○ | | | ○ | ○ |
| | 2ND | × | ○ | ○ | ◎ | | ○ | | | ○ | ○ | | ○ | | ○ | | ○ |
| | 3RD | × | × | ○ | ◎ | | ○ | | ○ | ○ | ○ | | | | ○ | | |
| | (3RD) | × | × | × | | | ○ | | ○ | ○ | ○ | | | | ○ | | |
| L | 1ST | ○ | ○ | ○ | | | ○ | | | | | ○ | ○ | | | ○ | ○ |
| | 2ND | × | ○ | ○ | | | ○ | | | ○ | ○ | ○ | | | ○ | | ○ |
| | (2ND) | × | × | × | | | ○ | | | ○ | ○ | ○ | | | ○ | | ○ |

NOTE:
- ○ ON
- × OFF
- ◎ ON: LOCKUP CLUTCH DUTY CONTROL / OFF: RELEASE

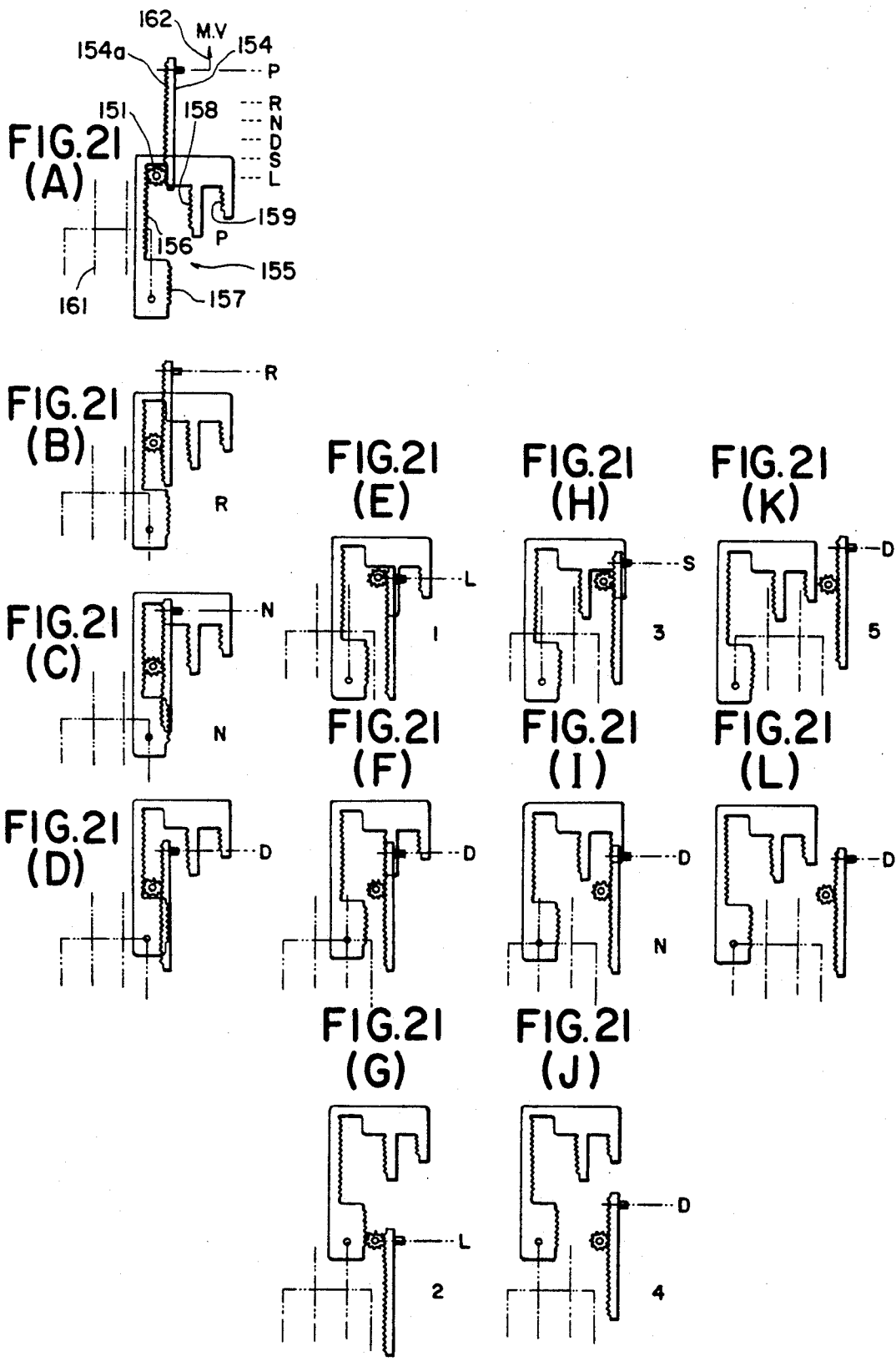

FIG. 25 (A)
FIG. 25 (B)
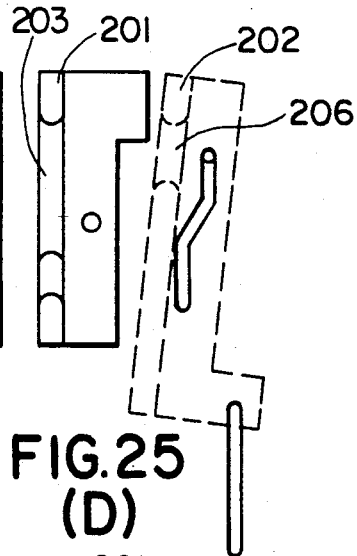
FIG. 25 (C)
FIG. 25 (D)
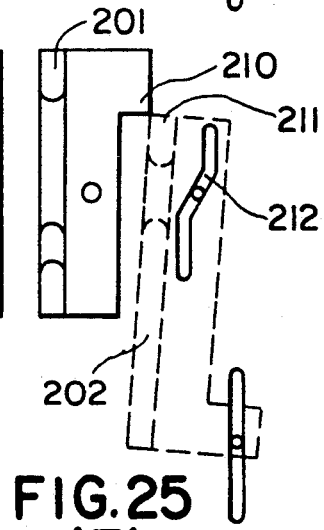
FIG. 25 (E)
FIG. 25 (F)
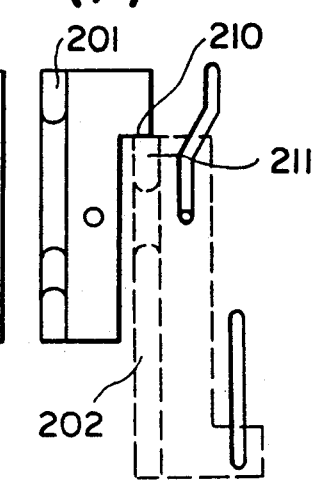

FIG. 27

| SHIFT POSITION | | SOLENOID | | | | CLUTCH | | | | BRAKE | | | | ONE-WAY CLUTCH | | | |
|---|---|---|---|---|---|---|---|---|---|---|---|---|---|---|---|---|---|
| | | $S_1$ | $S_2$ | $S_3$ | $S_4$ | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | ○ | ○ | ○ | | | | | | | | | ○ | | | | |
| R | V≤7 | × | ○ | ○ | | | | ○ | | | | ○ | ○ | | | | |
| | V>7 | ○ | ○ | ○ | | | | ○ | | | | × | ○ | | | | |
| N | | ○ | ○ | ○ | | | | | | | | | ○ | | | | |
| D | 1ST | ○ | ○ | ○ | | | ○ | | | | | ○ | ○ | | | ○ | ○ |
| | 2ND | × | ○ | ○ | ◎ | | ○ | | | | ○ | ○ | ○ | | | ○ | ○ |
| | 3RD | × | × | ○ | ◎ | | ○ | | | ○ | ○ | ○ | | | | ○ | |
| | 4TH | ○ | × | ○ | ◎ | ○ | ○ | | | | ○ | ○ | | | ○ | | |
| | 5TH | ○ | × | × | ◎ | ○ | | | | ○ | ○ | ○ | | | | | |
| | (N) | × | × | × | | | | | | ○ | ○ | ○ | | | | | |
| S | 1ST | ○ | ○ | ○ | | | ○ | | | | | ○ | ○ | | | ○ | ○ |
| | 2ND | × | ○ | ○ | ◎ | | ○ | | | | ○ | ○ | ○ | | | ○ | ○ |
| | 3RD | × | × | ○ | ◎ | | ○ | | | ○ | ○ | ○ | | | | ○ | |
| | 4TH | ○ | × | ○ | ◎ | ○ | ○ | | | | ○ | ○ | | | ○ | | |
| | (3RD) | × | × | × | | | ○ | | | ○ | ○ | ○ | | | | ○ | |
| L | 1ST | ○ | ○ | ○ | | | ○ | | | | | ○ | ○ | | | ○ | ○ |
| | 2ND | × | ○ | ○ | | | ○ | | | ○ | ○ | ○ | | | | ○ | ○ |
| | (2ND) | × | × | × | | | ○ | | | ○ | ○ | ○ | | | | ○ | ○ |

NOTE:
- ○ ON
- × OFF
- ◎ ON: LOCKUP CLUTCH DUTY CONTROL / OFF: RELEASE

AUTOMATIC TRANSMISSION FOR VEHICLE

BACKGROUND OF THE INVENTION

Conventionally, an automatic transmission for a vehicle has ranges P (parking), R (reverse), N (neutral), D (drive), S (second) and L (low) so that the gear ratio can be automatically changed when a driver selects any of the above-described ranges.

For example, in an automatic transmission of the type provided with five forward speed ranges and one reverse speed range, when a driver selects the D-range, in accordance with the vehicle speed and the degree of opening of the throttle, the gear ratio is automatically changed within a range between the first speed and the fifth speed. Furthermore, when the driver selects the S-range, the gear ratio is automatically changed in a range between the first speed and the third speed. Similarly, when the driver selects the L-range, the gear ratio is automatically changed in a range between the first speed and the second speed.

The range is selected in a conventional automatic transmission by an operator by moving the shift lever to one of a number of linearly disposed shift positions. That is, any of the shift positions arranged in the form of an I-shape can be selected.

However, the above-described conventional automatic transmission allows the gear ratio to be automatically switched in accordance with the operating conditions of the vehicle after a driver has once selected the range by moving the shift lever. Therefore, the desired gear ratio cannot be selected. Furthermore, a variety of gear ratios may be desired by drivers even under the same set of operating conditions. Therefore, the gear ratio which has been automatically selected by the automatic transmission is not always the gear ratio desired by the driver.

Another problem arises in that the conventional transmission cannot be operated with the feel of shifting feeling since the shift lever is moved linearly. Furthermore, since it has been difficult to recognize the selected shift position during the operation, a need exists for means capable of preventing an erroneous operation.

Therefore, there has been disclosed an automatic transmission for a vehicle in Japanese Patent Laid-Open No. 60-8912 which is arranged in such a manner that the gear ratio of the transmission can be fixed to that selected by a driver.

The above-described automatic transmission for a vehicle has been arranged in such a manner that the shift lever can be moved longitudinally and laterally so that shift positions arranged in the form of an H-shape can be selected in a manner similar to a manual transmission. Furthermore, there is provided a switch which is switched on when the shift lever is positioned at any of the shift positions so that a desired range and gear ratio can be selected in accordance with the position of the switch.

Another automatic transmission for a vehicle has been disclosed in Japanese Patent Laid-Open No. 61-157855 which has shift positions arranged in the form of an H-shape that can be selected in the manner of a manual shift in addition to the shift positions arranged in the form of the I-shape so used in the conventional automatic transmission.

In this case, when a shift position is selected from those arranged in the form of the H-shape, the switch disposed at the corresponding shift position is switched on so that a desired gear ratio is selected. On the contrary, when a shift position is selected from those arranged in the form of the I-shape, a desired range is selected.

In the thus structured automatic transmission for a vehicle, since a driver is able to select a desired shift position from those arranged in the form of the H-shape, the driver can optionally change the range and the gear ratio. Therefore, the feeling of manual shifting is obtained and erroneous operation can be prevented. In addition, direct shifting from a certain range or a gear ratio to another range or gear ratio is enabled, thus enabling the vehicle operation states to be varied.

In the above-described technology, the driver is able to select a shift position. However, in a case where jump shifting is performed in an automatic transmission provided with the low to the fifth (top) speeds, for example, when the vehicle speed is shifted from a first speed to the third speed or from the top speed to the third speed, the rotational speed input to the automatic transmission is considerably changed. As a result, an undesirable shock occurs due to the transmission operation, causing the life of each of the frictional engagement elements to be shortened.

As described above, since jump shifting has a multiplicity of problems, it must be prevented by some measures. It might therefore be considered feasible to employ a structure arranged in such a manner that the gear ratio is changed to the desired gear ratio via an intermediate gear ratio if the gear ratio next in succession is not selected, whereby the jump shifting can be prevented. However, it creates an excessively long time between the time the gear ratio is selected and the time the selected gear ratio is established.

In none of the above-described automatic transmissions, is any of the intermediate positions between the shift positions arranged in the form of the H-shape arranged to be the position at which a desired range or a gear ratio is selected. Usually, the gear ratio prior to the change of the shift position is maintained at the above-described intermediate position in order to stabilize operation.

Therefore, when a driver wants, during driving, to switch from the automatic transmission mode to the manual transmission mode and to drive the vehicle at a certain gear ratio, the shift lever must be moved through the intermediate position before switching to the desired gear ratio will occur.

In addition, in a case where the driver wants to cancel the manual transmission mode during driving, it is necessary for the driver to move the shift lever to a predetermined shift position which corresponds to an automatic transmission range in the form of the H-shape pattern.

As described above, in either of the case in which the manual transmission mode is changed to the automatic transmission mode or the case in which the automatic transmission mode is changed to the manual transmission mode, it is necessary for the driver to temporarily place the shift lever to the intermediate position, complicating the operation to be performed by the driver.

An object of the present invention is to provide an automatic transmission for a vehicle arranged in such a manner that the range and the gear ratio can be freely changed by the driver, the feel of shifting can be obtained, a desired range or a gear ratio can be directly selected from a certain range or a gear ratio so that the driving state can be varied. Another object is that, even if a discontinuous gear ratio is selected, generation of an excessively large shock within the transmission operation can be prevented, and the life of each of the frictional engagement elements is not shortened. A further object is to assure that shifting to the selected gear ratio is quickly established while providing a feeling of shifting as in the case of a manual transmission.

Another object of the present invention is to provide an automatic transmission for a vehicle capable of immediately changing a certain gear ratio during the vehicle driving in the manual transmission mode to the automatic transmission mode or changing the automatic transmission mode to the manual transmission mode.

SUMMARY OF THE INVENTION

Accordingly, an automatic transmission for a vehicle according to the present invention is provided with a shift lever having shift positions in the form of a pattern including at least a portion in a H-shape. As a result, when the shift lever is moved to any of the thus arranged shift positions, the range or the gear ratio which corresponds to the shift position can be selected.

Furthermore, there are provided means for shifting the lowest gear ratio to the gear ratio which is higher than the lowest gear ratio by one step when the shift lever is released from the lowest shift position and means for shifting the highest gear ratio to the gear ratio which is lower than the highest gear ratio by one step when the shift lever is released from the highest shift position.

In addition, in order to select the range and the gear ratio which corresponds to the shift position to which the shift lever has been moved, there is provided a manual valve for selectively opening/closing a port in accordance with the position of the spool, as dictated by the position of the shift lever. Guide means is provided for restricting the movement of the shift lever to a pattern including at least an H-shape portion, manual valve switching action generation means for generating an action for switching the manual valve in accordance with the movement of the shift lever. A linkage is connected to the manual valve switching action generation means to transmit the movement of the manual valve switching action generation means to the spool of the manual valve and a hydraulic circuit is connected to the manual valve and arranged to switch the hydraulic pressure in response to selection of the range and the gear ratio.

In this case, the manual valve supplies the hydraulic pressure which corresponds to at least one forward range, the parking range, the reverse range or the neutral range. Furthermore, there is provided a switch for generating a signal which corresponds to the above-described shift position when the shift lever is placed in that shift position.

Therefore, in a case of jump shifting, for example, in a case where the gear ratio is changed from that for the first speed to that for the third speed in an automatic transmission having the low to the fifth gear ratios, the shifting from the first speed to the second speed is started simultaneously with the release of the shift lever from the first speed position. In the case where the gear ratio is changed from the fifth (top) speed to the third speed, the shifting from the top speed to the fourth speed is started simultaneously with the release of the shift lever from the top speed position. That is, the shifting to the third speed is not commenced simultaneously with the time at which the third shift position has been selected. In this manner, the gear ratio can quickly be shifted to the selected gear ratio, while preventing the jump shifting, without an excessively large time lag.

Furthermore, jump shifting can be prevented and the shifting is thereby effected in an ordinary sequential order as the first speed, the second speed and the third speed or the fifth (the top) speed, the fourth speed and the third speed. As a result, an excessively large shock in the transmission operation can be prevented and the life of each of the frictional engagement elements is not shortened.

In addition, the manual valve is operated so that a predetermined shifting is performed in synchronization with the operation in which any of the shift positions is selected by the operation of the shift lever. Therefore, even if the electric system encounters a failure, the spool is placed at the position which corresponds to the shift position at that time, allowing the vehicle to be safely driven.

According to another embodiment of the present invention, there are provided (1) a previous stage maintaining means for maintaining the range or the gear ratio which corresponds to the shift position before the movement of the shift lever when the shift lever has been moved to the intermediate position between the shift positions and (2) automatic transmission mode selection means for selecting an automatic transmission range when the shift lever has been moved to the intermediate position between the shift positions.

Furthermore, there is provided means for switching the above-described previous stage maintaining means and the automatic transmission mode selection means, the switching means being arranged in such a manner that it detects whether or not a driver is operating the shift lever so as to switch the previous stage maintaining state to the automatic transmission mode.

Therefore, in the case where a driver intends to drive the vehicle at another gear ratio during the driving of the vehicle in the manual transmission mode by repositioning the shift lever to the shift position for a certain gear ratio, the shift lever is temporarily moved to the intermediate position.

At this time, since the driver is operating the shift lever, the range or the gear ratio which corresponds to the shift position before the movement is maintained.

When the driver stops the operation of the shift lever by, for example, releasing the shift lever positioned at the intermediate position, the automatic transmission mode is established so that an automatic transmission range is selected. Therefore, the necessity of again selecting the shift position which corresponds to the automatic transmission mode is eliminated. Furthermore, when driving of the vehicle in the automatic transmission mode, a desired different gear ratio can be immediately selected. On the other hand, in the case where the gear ratio has been changed by sequential operations, the gear ratio before the movement can also be maintained at the intermediate position. Therefore, there is no unnecessary stoppage of the power transmission, allowing driving to be performed stably.

Since a predetermined switching is performed because the manual valve is operated in synchronization with the operation in which any of the shift positions is selected by operating the shift lever, the spool is placed at the position which corresponds to the shift position at that time. Therefore, even if the electric system encounters a failure, the vehicle can be stably driven.

Furthermore, the manual valve switching action generation means may comprise a link mechanism which provides two individual linear motions corresponding to the shift position of the shift lever and two manual valves may be connected to the link mechanism.

In the case of a structure having one manual valve, when a range is shifted from, for example, the N-range or the D-range to the L-range, the spool position is necessarily changed in the manual valve via the S-range. Therefore, the pressure for realizing the L-range cannot be immediately generated. However, according to the present invention, since each of the pressure levels necessary for each of the ranges can be generated by combining the two manual valves, the time necessary to complete the shifting can be shortened.

BRIEF DESCRIPTION OF DRAWINGS

The structure and the features of the automatic transmission for vehicle according to the present invention will be apparent with reference to the following drawings.

FIG. 9 (B) illustrates the contacts in the switch of FIG. 8 disposed on a second manual valve side;

FIG. 10 (A) is a perspective view which illustrates the manual valve switching action generation means;

FIG. 10 (B) illustrates an exploded state of the same;

FIG. 15 is a chart illustrating the operation of the twin type manual valve type automatic transmission;

FIG. 16 (B) is a cross sectional view which illustrates the restriction means of FIG. 16A;

FIG. 17 illustrates the mechanical structure of a plate cam type manual valve switching action generation means;

FIG. 17 (A) illustrates a shift pattern of the shift lever;

FIG. 17 (B) is an X-directional view of FIG. 17 (A);

FIG. 17 (C) is a Y-directional view of the same;

FIG. 17 (D) is a plan view of the cam plate;

FIG. 18 illustrates the various states of the cam plate;

FIG. 18 (A) illustrates first speed;

FIG. 18 (B) illustrates second speed;

FIG. 18 (C) illustrates third speed;

FIG. 18 (D) illustrates fourth speed;

FIG. 18 (E) illustrates fifth speed;

FIG. 18 (F) illustrates the R-range;

FIG. 20 is a chart illustrating the operation of the plate cam type automatic transmission;

FIG. 21 illustrates the state of a rack & pinion in each of the driving ranges and gear ratios;

FIG. 21 (A) illustrates the P-range;

FIG. 21 (B) illustrates the R-range;

FIG. 21 (C) illustrates the N-range;

FIG. 21 (D), 21 (F), 21 (I) and 21 (L) illustrate the intermediate position;

FIG. 21 (E) illustrates the first speed range;

FIG. 21 (G) illustrates the second speed range;

FIG. 21 (H) illustrates the third speed range;

FIG. 21 (J) illustrates the fourth speed range;

FIG. 21 (K) illustrates the fifth speed range;

FIG. 24 (A) illustrates the P-range;

FIG. 24 (B) illustrates the N-range;

FIG. 24 (C) and 24 (D) illustrates the intermediate position;

FIG. 24 (E) illustrates the first speed;

FIG. 24 (F) illustrates the second speed;

Figure 26:
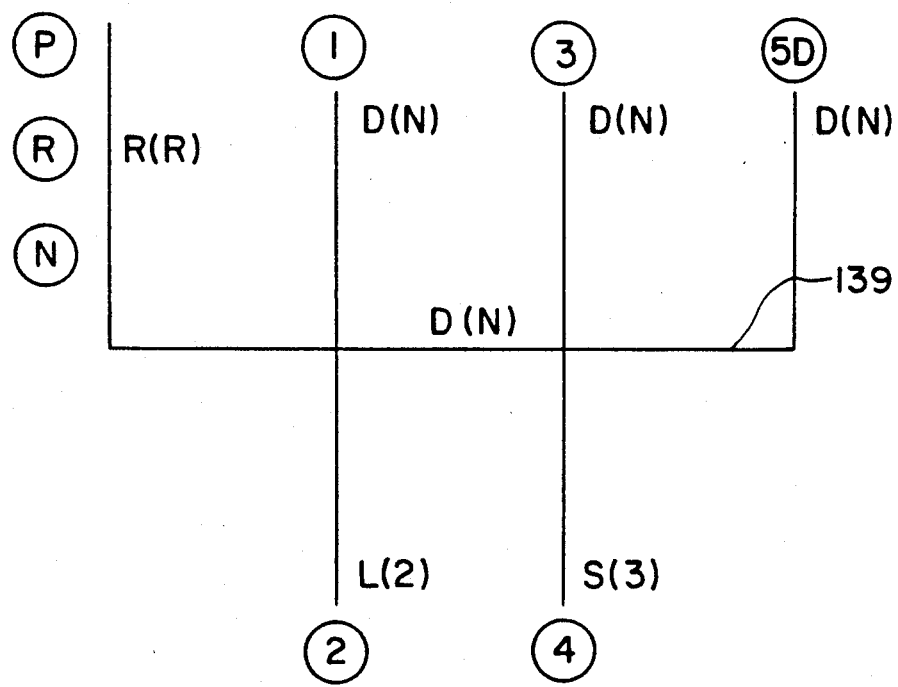
Figure 28:
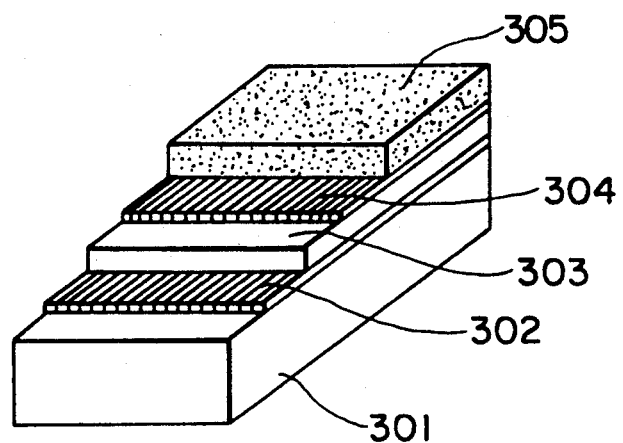
Figure 29:
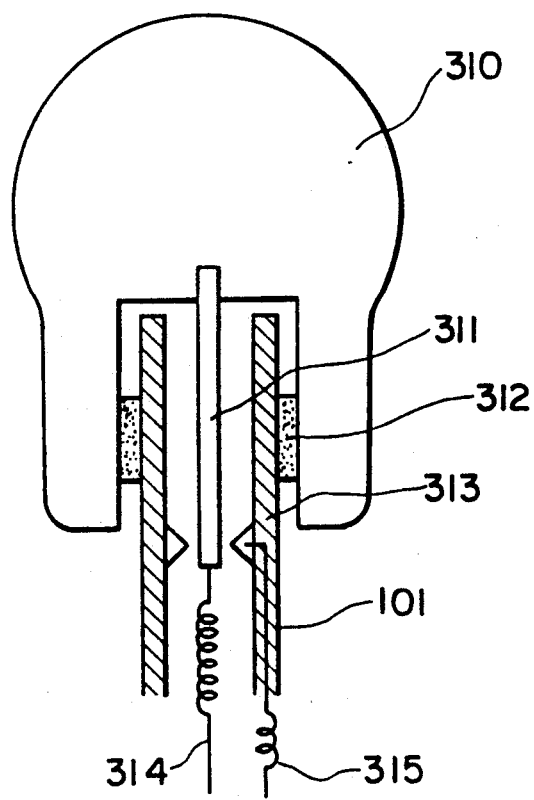
Figure 30:
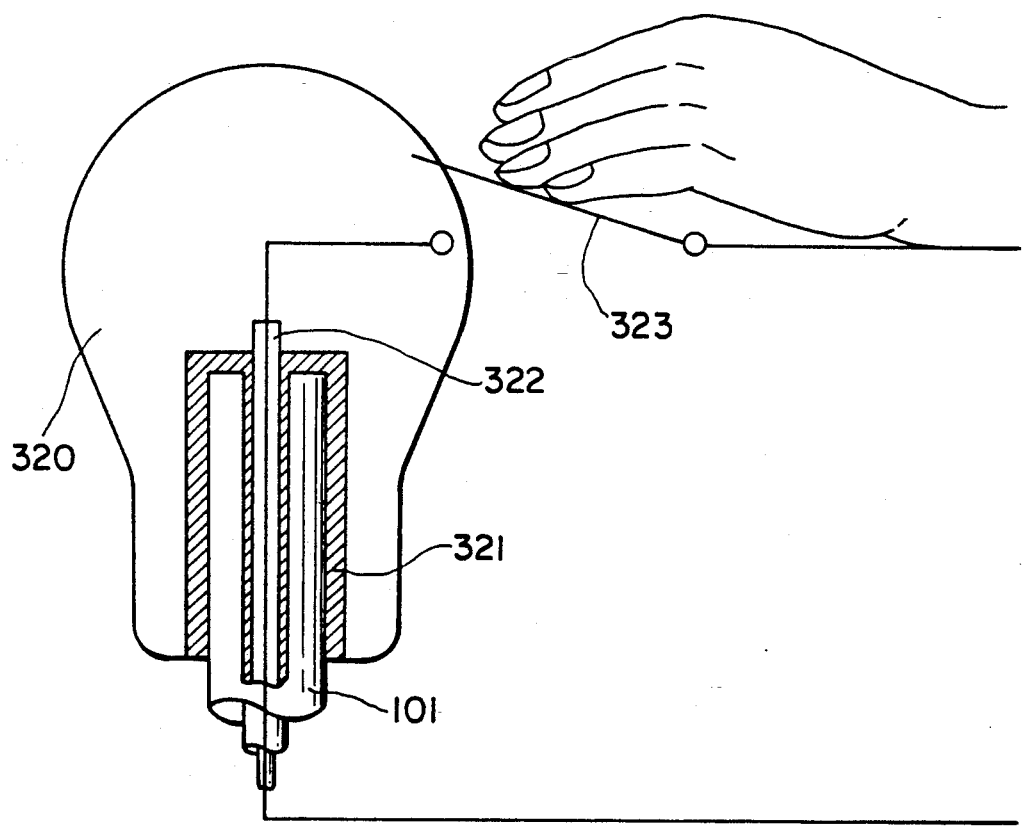
Figure 31:
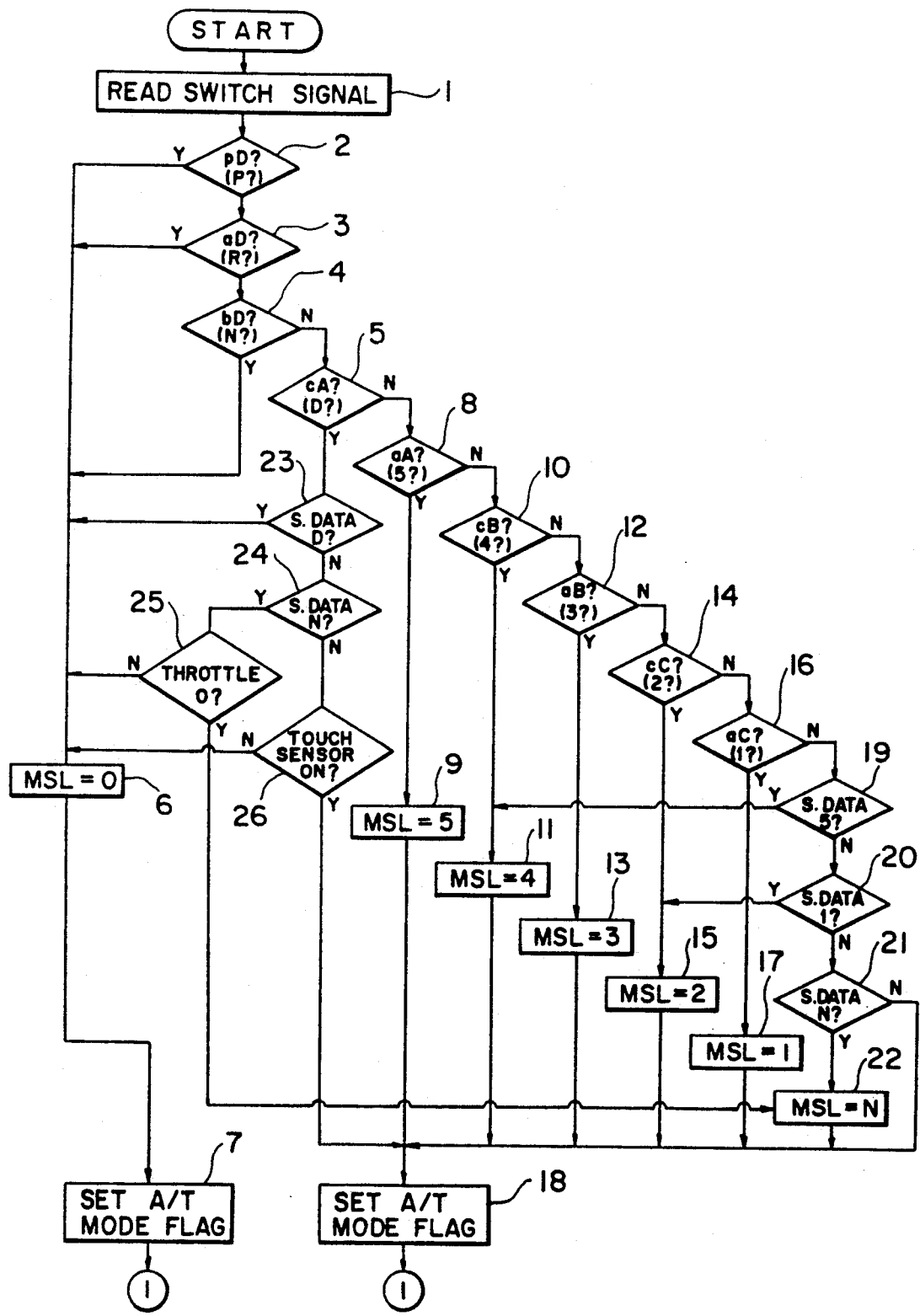
Figure 32:
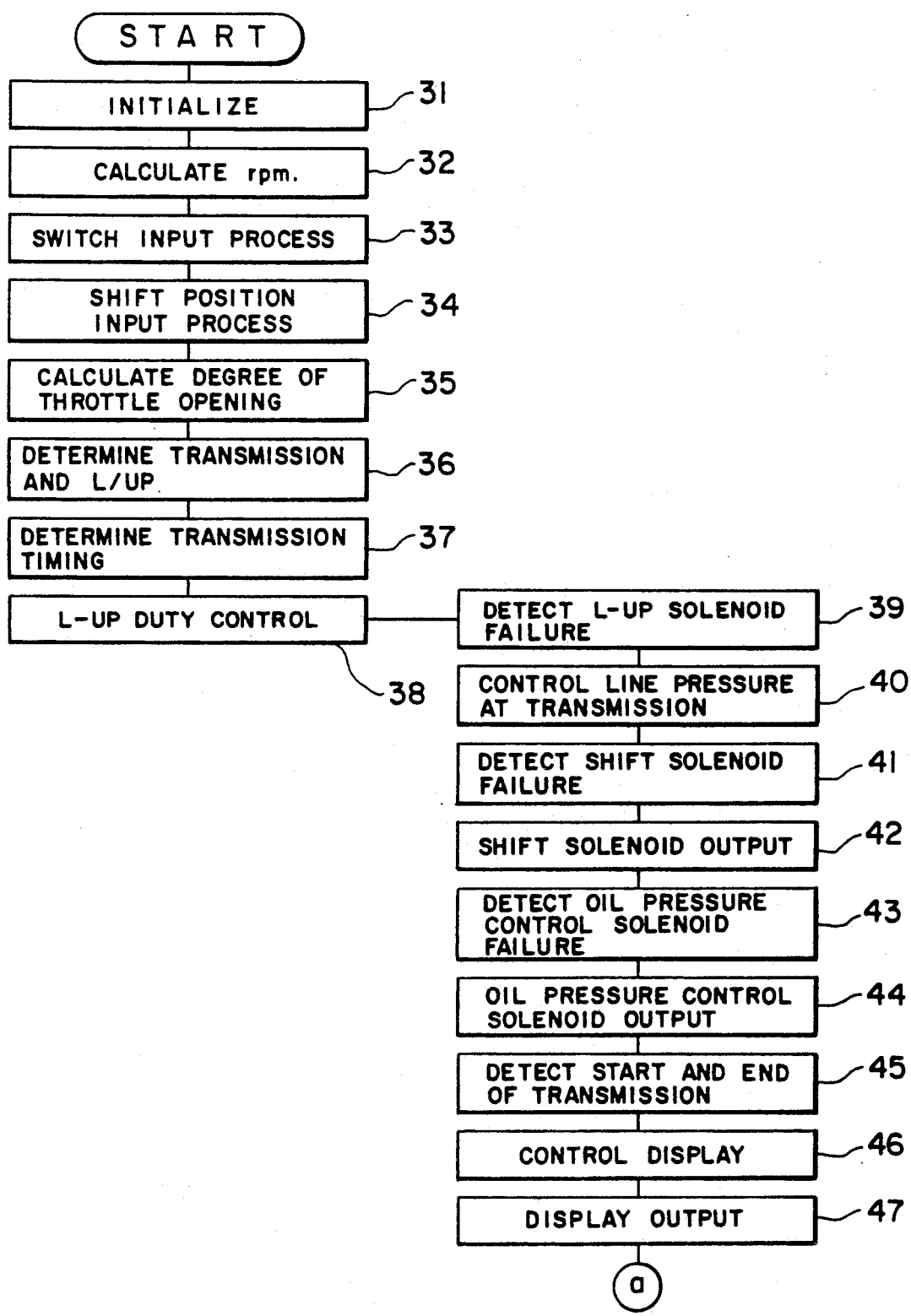

FIG. (G) illustrates the third speed;

FIG. 24 (H) illustrates the fourth speed;

FIG. 24 (I) illustrates the fifth speed;

FIG. 25 is a series of perspective views illustrating the mechanical operation of the manual valve switching action generation means;

FIG. 25 (A) is a plan view which illustrates the manual valve switching action generation means at the first speed;

FIG. 25 (B) is a side elevational view of the same at the first speed;

FIG. 25 (C) is a plan view which illustrates the same at the N-range;

FIG. 25 (D) is a side elevational view of the same at the N-range;

FIG. 25 (E) is a plan view which illustrates the same at the second speed;

FIG. 25 (F) is a side elevational view which illustrates the same at the second speed;

FIG. 26 illustrates the shift positions of the plate type manual valve switching action generation means;

FIG. 27 is a chart illustrating the operation of the plate type automatic transmission;

FIG. 28 is a perspective view of a touch sensor disposed in the shift knob;

FIG. 29 is a cross-sectional view showing the touch sensor disposed in the shift knob;

FIG. 30 is a cross-sectional view of another example of a touch sensor disposed in the shift knob;

FIG. 31 a flow chart which illustrates the shift control operation of the automatic transmission according to the present invention; and FIG. 32 is a flow chart which illustrates the control operation of the automatic transmission.

DESCRIPTION OF PREFERRED EMBODIMENT

Preferred embodiments of the present invention will now be described with reference to the drawings.

Figure 2:
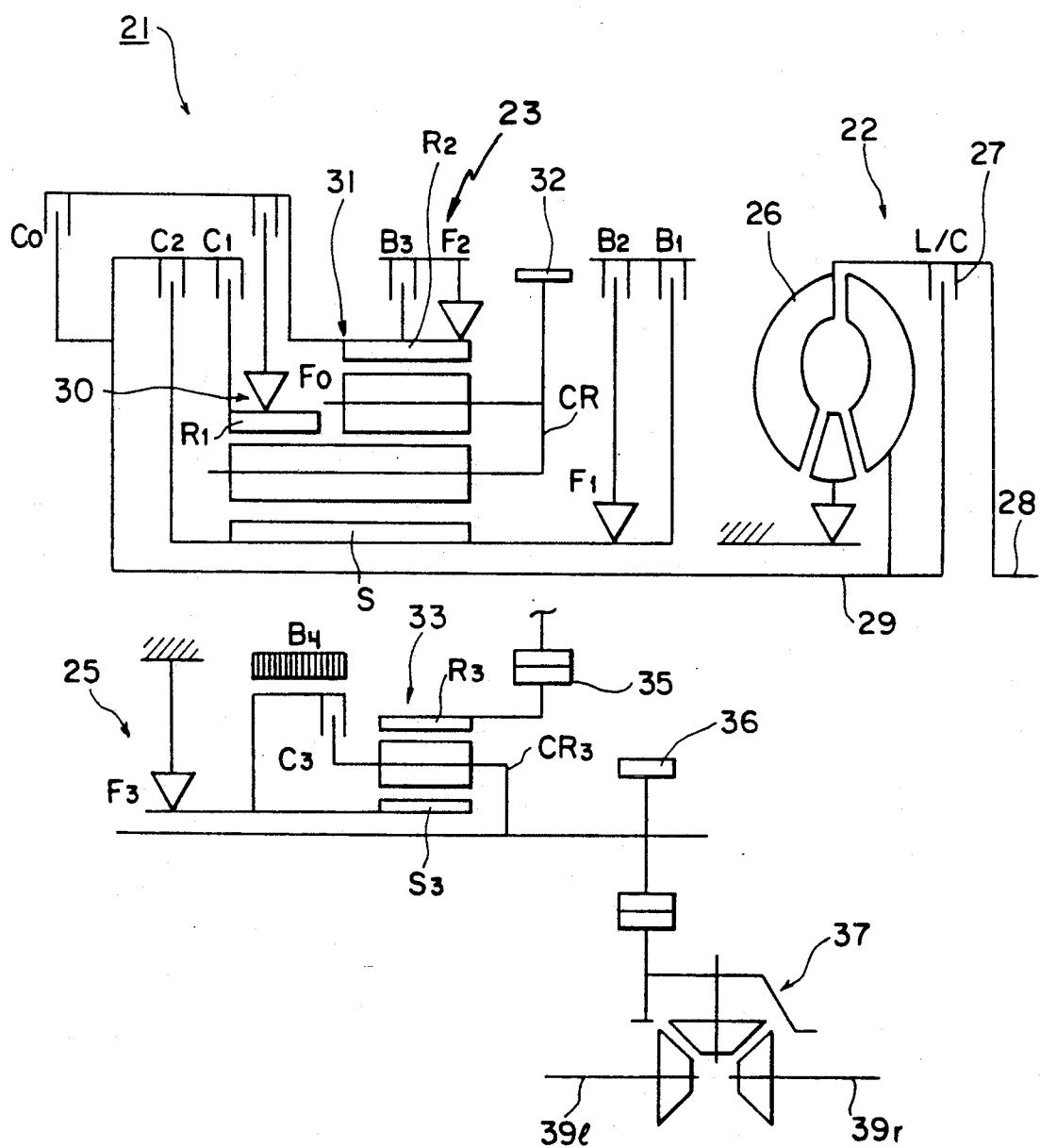
FIG. 2 is a schematic illustration of the structure of an automatic transmission for a vehicle according to the present invention.

Referring to FIG. 2, an automatic transmission 21 having five gear ratios comprises a torque converter portion 22, a four-speed automatic transmission mechanism portion 23 which constitutes a main transmission mechanism portion and a U/D (Under Drive) mechanism portion 25 which constitute a sub-transmission mechanism portion.

The torque converter portion 22 has a torque converter 26 and a lockup clutch 27 so as to transmit the rotation of an engine crank shaft 28 to an input shaft 29 via by a fluid coupling or by a mechanical coupling established by the lockup clutch 27.

The four-speed automatic transmission mechanism portion 23 is provided with a single planetary gear unit 30 and a dual planetary gear unit 31, a carrier CR and a sun gear S of the above-described two planetary gear units 30 and 31 being integrally connected to each other. The input shaft 29 is connected to a ring gear $R_1$ of the single planetary gear unit 30 via a first clutch $C_1$, the input shaft 29 being further connected to the sun gear S via a second clutch $C_2$.

The sun gear S is directly braked by a first brake $B_1$ and its one directional rotation is restricted by a second brake $B_2$ via a first one-way clutch $F_1$. Ring gear $R_1$ of the single planetary gear unit 30 is connected to the ring gear $R_2$ of the dual planetary gear unit 31 via a third clutch $C_0$. A third one-way clutch $F_0$ is interposed between the ring gear $R_1$ and the ring gear $R_2$ for the purpose of restricting the rotation of the ring gear $R_1$ so as not to become slower than the rotation of the ring gear $R_2$ when the clutch is connected. The carrier CR is connected to a counter drive gear 32 which serves as an output member of the four speed automatic transmission mechanism portion 23.

The under drive mechanism portion 25 comprises a single planetary gear unit 33 which has a ring gear $R_3$ connected to a counter-driven gear 35 which is always engaged to the above-described counter drive gear 32, the single planetary gear unit 33 having a carrier $CR_3$ connected to an output pinion 36.

Sun gear $S_3$ is restricted to rotation in one direction by a fourth one-way clutch $F_3$ and is braked by a fourth brake $B_4$, the sun gear $S_3$ being connected to the carrier $CR_3$ via a fourth clutch $C_3$.

The output pinion 36 is connected to the right and left front axles 39r and 39l via a differential device 37.

A shift lever for use in the above-described automatic transmission for a vehicle will now be described.

FIGS. 3, 4, 5 and 6 are perspective views which illustrate a shift lever of the automatic transmission for a vehicle according to the present invention.

Referring to the drawings, reference numeral 101 represents a shift lever for switching the driving range and the gear ratio in accordance with the desire of a driver. Reference numeral 102 represents a guide plate serving as guide means for longitudinally and laterally restricting the movement of the shift lever 101. The guide plate 102 is arranged with one of guide groove patterns 103a, 103b, 103c and 103d formed therein. Each of the guide grooves 103a, 103b, 103c and 103d has shift positions arranged in the form of a so-called H-pattern including one or more H-shape portion.

The guide groove pattern 103a (to be called a "first pattern" hereinafter) has three longitudinally elongated grooves 105a, 106a and 107a above a lateral groove 104a and three longitudinally elongated grooves 108a, 109a and 110a below the same. The driving ranges and the gear ratios to be selected by the shift lever 101 are arranged in such a manner that the D-range of the automatic transmission mode is made correspond to the groove 104a, the first gear ratio is made correspond to the groove 105a, the third gear ratio is made correspond to the groove 106a, the fifth gear ratio is made correspond to the groove 107a, the second gear ratio is made correspond to the groove 108a, the fourth gear ratio is made correspond to the groove 109a and the N, R and P ranges are made correspond to the groove 110a.

On the other hand, the guide groove 103b (to be called a "second pattern" hereinafter) has four longitudinally elongated grooves 105b, 106b and 107b and 108b above a lateral groove 104b and two longitudinally elongated grooves 109b and 110b below the same.

The driving ranges and the gear ratios to be selected by the shift lever 101 are arranged in such a manner that the D-range of the automatic transmission mode is made correspond to the groove 104b, the P, R and N ranges are made correspond to the groove 105b, the first gear ratio is made correspond to the groove 106b, the third gear ratio is made correspond to the groove 107b, the fifth gear ratio is made correspond to the groove 108b, the second gear ratio is made correspond to the groove 109b and the fourth gear ratio is made correspond to the groove 110b.

The guide groove 103c (to be called a "third pattern" hereinafter) has four longitudinally elongated grooves 105c, 106c, 107c and 108c above a lateral groove 104c and three longitudinally elongated grooves 109c, 110c and 111c below the same. The driving ranges and the gear ratios to be selected by the shift lever 101 are arranged in such a manner that the groove 104c is utilized as the previous stage maintaining groove the P, R and N ranges are made correspond to the groove 105c, the first gear ratio is made correspond to the 106c, the third gear ratio is made correspond to the groove 107c, the fifth gear ratio is made correspond to the groove 108c, the second gear ratio is made correspond to the groove 109c, the fourth gear ratio is made correspond to the groove 110c and the D-range of the automatic transmission mode is made correspond to the groove 111c.

The guide groove 103d (to be called a "fourth pattern" hereinafter) has three longitudinally elongated grooves 105d, 106d and 107d above a lateral groove 104d and three elongated grooves 108d, 109d and 110d below the same. Furthermore, a groove 111d is elongated from the groove 110d in the form of a crank and a groove 112d extends from the groove 111d in the form of a crank. The driving ranges and the gear ratios to be selected by the shift lever 101 are arranged in such a manner that the D-range of the automatic transmission mode is made correspond to the groove 104d, the first gear ratio is made correspond to the 105d, the third gear ratio is made correspond to the 106d, the fifth gear ratio is made correspond to the groove 107d, the second gear ratio is made correspond to the groove 108d, the fourth gear ratio is made correspond to the groove 109d, the N-range is made correspond to the groove 110d, the R-range is made correspond to the groove 111d and the P-range is made correspond to the groove 112d.

In any of the above-described first to the fourth patterns, all of the shift positions are simply accommodated in the H-shape pattern. As a result, the shift positions are arranged in the same configuration as that of a manual transmission. Therefore, a driver is able to select the range or the gear ratio while sensing the feel of manual shifting. Therefore, erroneous operation of the shift lever can be prevented and the vehicle can thereby be driven smoothly.

The guide means according to the present invention is not limited to the guide plate. Any means may be employed if it is able to restrict the movement of the shift lever in accordance with a predetermined pattern. For example, a detente mechanism may be employed.

Since any of the shift positions can be freely and directly selected by a driver, the time taken to select the range and the gear ratio can be shortened and as well as the shift shock generated due to the transmission operation performed via another range or the gear ratio can be prevented.

In order to generate a movement for switching a manual valve responsive to the shift lever being operated in accordance with any of the above-described first to fourth patterns, there is provided a manual valve switching action generation means which is arranged to act in accordance with the movement of the shift lever which is restricted by the guide plate 102.

In one embodiment an automatic transmission for a vehicle is provided with a manual valve switching action generation means of a type composed of a link mechanism having two individual linear motions responsive to the movement of the shift lever, that is, the manual valve switching action generation means includes a twin manual valve type manual valve switching action generation means.

According to this embodiment, as the link mechanism which provides the two individual linear motions in accordance with the action of the shift lever, the link mechanism used in a conventional manual transmission is employed.

Figure 7:
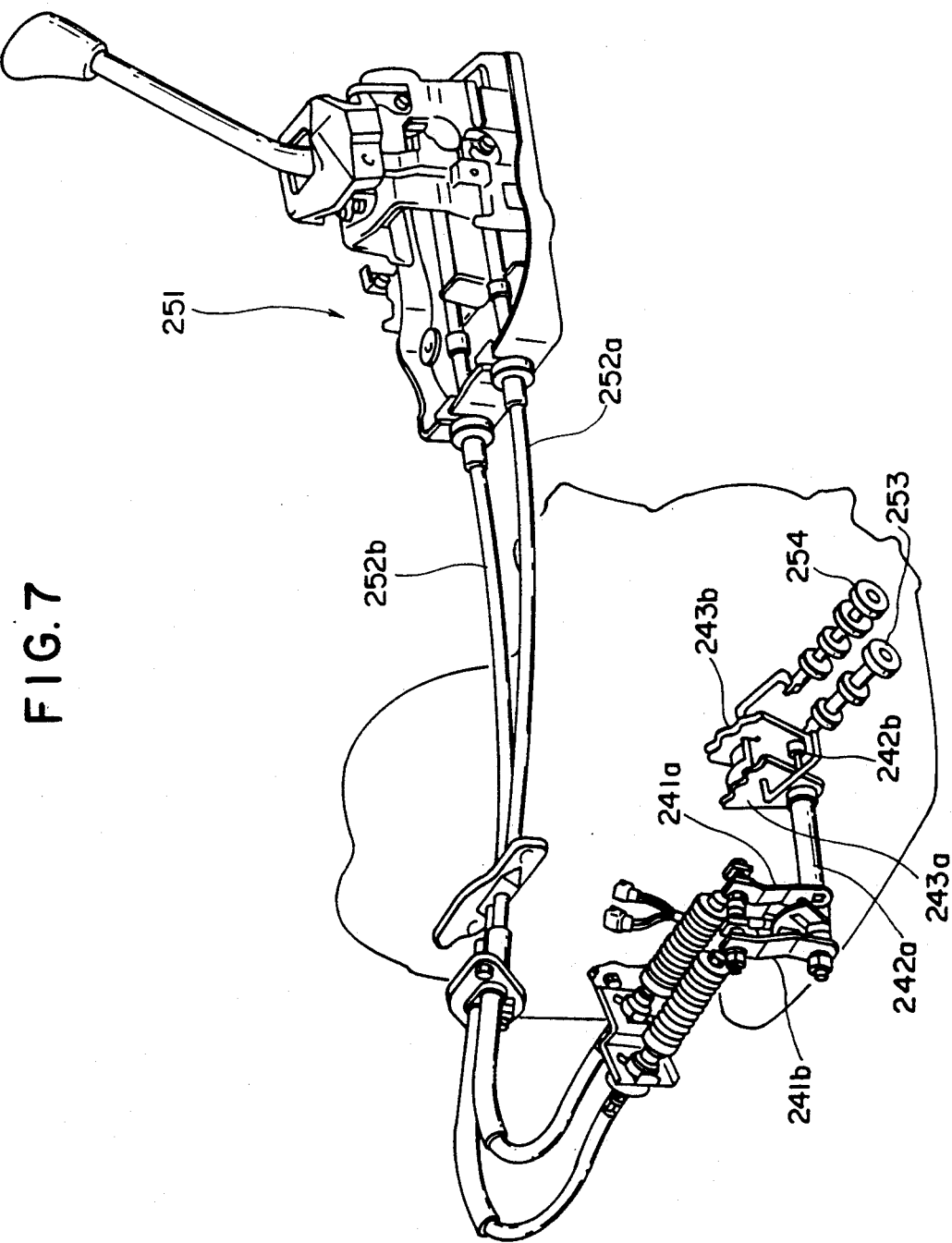
FIG. 7 is a perspective view of the mechanism providing connection between the manual valve switching action generation means and manual valves in a twin manual valve type automatic transmission.

Referring to FIG. 7, reference numeral 251 represents a link mechanism which provides two individual linear motions in the twin manual valve type manual valve switching action generation means. These linear actions are transmitted to a first manual valve 253 on the select side via linkages (cables) 252a and 252b and are transmitted as well to a second manual valve 254 on the shift side.

The motions of the linkages 252a and 252b swing control levers 241a and 241b. As a result, detentes 243a and 243b are swung via bars 242a and 242b. The detentes 243a and 243b are connected to the corresponding manual valves 253 and 254. The swinging motion of the detentes 243a and 243b causes the spools to be moved. Since the friction generated in the linkage portions other than detentes 243a and 243b can be reduced considerably and friction is equally generated at each of the shift positions of the shift lever 101, the response characteristics at the time of the shifting operation can be freely set by changing the shape of each of the detentes 243a and 243b.

Each of the detentes 243a and 243b has a recessed portion at a position which corresponds to the position of the manual valves 253 and 254 at which each of the range pressures is generated. A detente spring (omitted from illustration) is engaged to each of the recessed portions so that the spool can be secured at a predetermined position.

Reference numerals 245a and 245b represent first switch members fixed to the above-described bars 242a and 242b, respectively, and arranged to act in cooperation with the bars 242a and 242b.

Each of the first switch members 245a and 245b is provided with a neutral start switch (omitted from illustration) and a switch arranged to be switched on when the shift lever 101 is placed at each of the shift positions.

Figure 8:
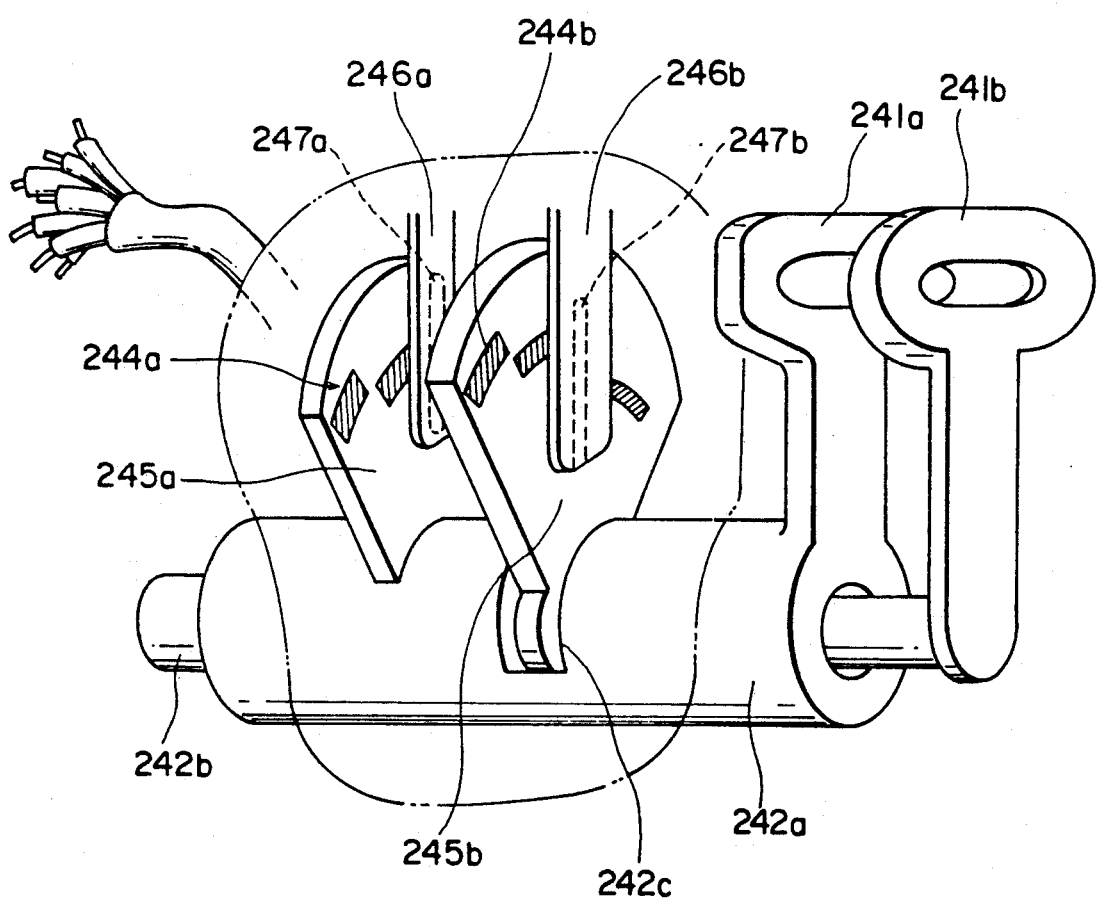
FIG. 8 is a perspective view of a first embodiment of a switch member and in the present invention.

FIG. 8 illustrates the arrangement of the first switch members.

The first switch member 245a is secured to the bar 242a while the first switch member 245b is secured to the bar 242b, with the first switch member 245b extending through a groove 242c formed in the bar 242a. Therefore, when the bars 242a and 242b are rotated, the first switch members 245a and 245b pivot. The first switch members 245a and 245b have on their surfaces first contact patterns 244a and 244b so that the switch is selectively switched on in accordance with the positions assumed by the swinging first switch members 245a and 245b. Furthermore, there are provided second switch members 246a and 246b in a manner allowing relative movement of the first switch members 245a and 245b. In addition, second contacts 247a and 247b are provided for the second switch members 246a and 246b.

Figure 9A:
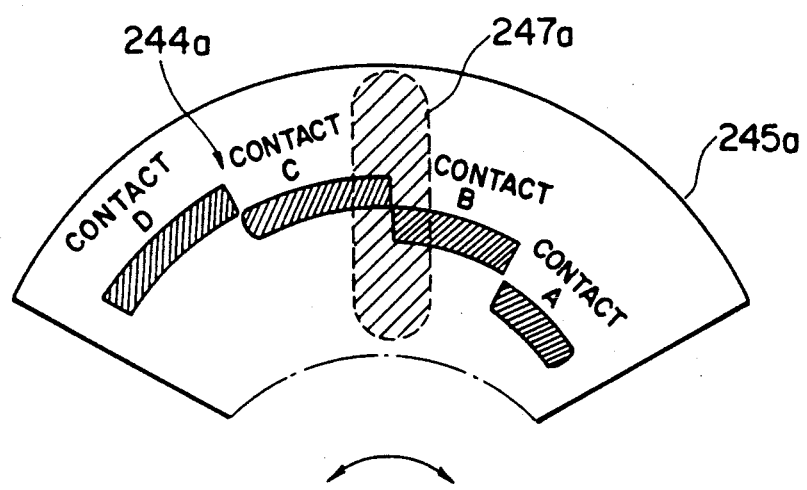
FIG. 9 (A) illustrates the contacts in the switch of FIG. 8 disposed on a first manual valve side.
Figure 9B:
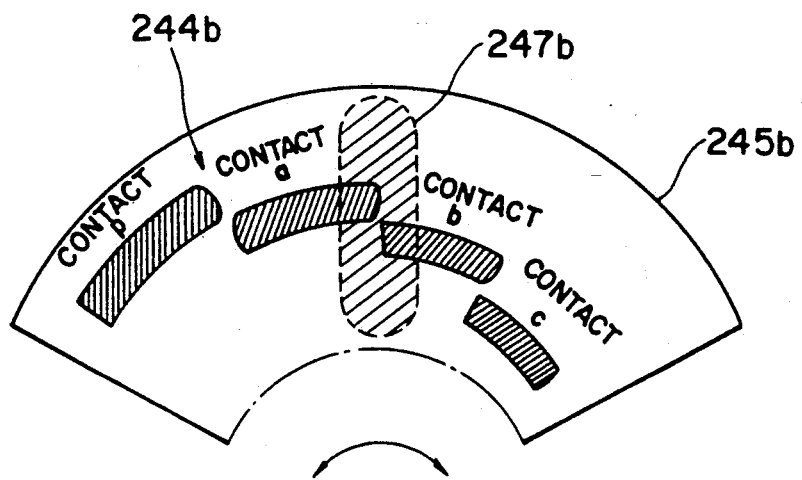

Referring to FIG. 9A and 9B, the first contact pattern 244a is arranged in such a manner that contacts A to D are successively disposed for successive contact with the second contact 247a. The first contact pattern 244b is arranged in such a manner that contacts p and a to c are successively disposed for contact with the second contact 247b.

The thus constituted switch acts in such a manner that the contacs A to D selectively come in contact with the second contact 247a and the contacts p and a to c selectively come in contact with the second contact 247b in accordance with the shift position of the shift lever 101 as described later, whereby the range and the gear ratio can be selected.

Referring to FIG. 10a and 10b, first and second operation members 255 and 256 extending perpendicularly to each other are formed at the lower end portion of the shift lever 101. As a result, when the shift lever 101 is swung in a direction designated by an arrow X (laterally), the first operation member 255 vertically swings.

An L-shaped bell crank 257 is supported in such a manner that it can be swung relative to a fulcrum 258, the bell crank 257 having an end portion 259 to which the front end portion of the first operation member 255 is engaged. In synchronization with the vertical movement of the first operation member 255, another end portion 260 of the bell crank 257 is reciprocated back and forth.

When the shift lever 101 is swung in a direction designated by an arrow Y (longitudinally), the second operation member 256 is reciprocated back and forth.

As described above, when the shift lever 101 is laterally or longitudinally moved, the first and the second operation members 255 and 256 can be individually reciprocated. The shift positions of the above-described shift lever 101 are arranged as the third pattern shown in FIG. 5.

Figure 11:
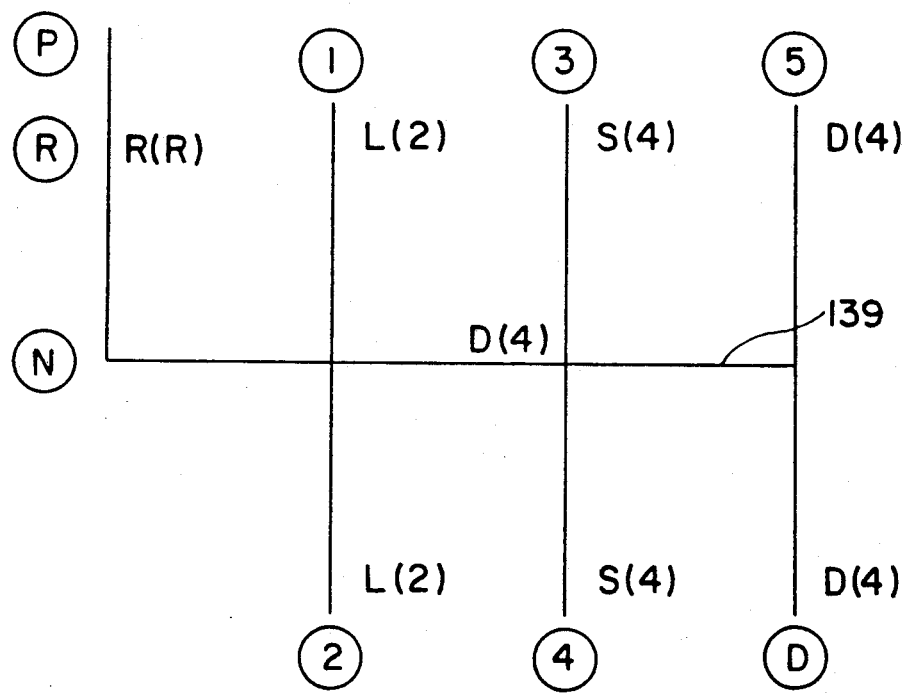
FIG. 11 illustrates shift positions of the twin manual valve type manual valve switching action generation means.

FIG. 11 illustrates the shift position of the twin manual valve type manual valve switching action generation means.

As described above, the movement of the shift lever 101 in accordance with the second pattern results in generation of the range pressures from the manual valves denoted by symbols in the vicinity of encircled symbols which denote the shift positions.

An intermediate position 139 which is not one of the shift positions may be used to maintain the previous stage or used as the D-range position. In this case, when the shift lever 101 is placed at the intermediate position 139, the vehicle is put in the automatic transmission mode.

In order to prevent the D-range from undesirably being selected simultaneously with the movement of the shift lever 101 to the intermediate position 139, in the case where a change of shift position from a certain gear ratio to another gear ratio is intended there is provided means for determining whether or not a driver is touching the shift knob of the shift lever 101. In the case where the driver is touching the shift knob, a determination is made that manual shifting is being performed so that the previous stage, that is, the previous gear ratio is maintained. Furthermore, in the case where the driver takes his hand off the shift knob, it is determined that the driver does not intend to shift the gear ratio so that the automatic transmission mode is established.

The action generated by the above-described manual valve switching action generation means is transmitted to the first manual valve 253 and the second manual valve 254 so that the desired range or gear ratio is selected.

Figure 12:
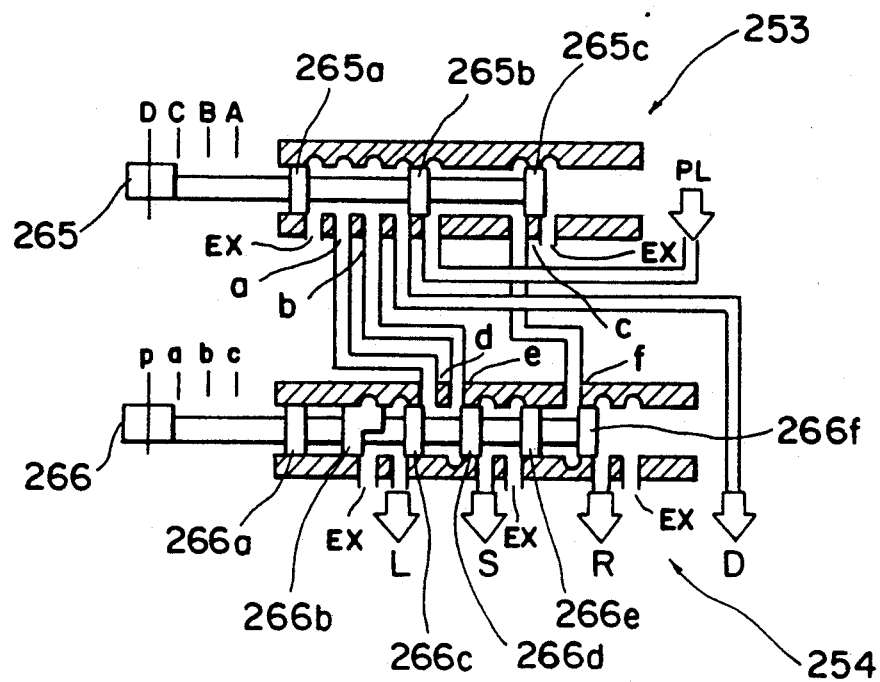
FIG. 12 is a schematic representation of the connection established between the first manual valve and the second manual valve.

FIG. 12 illustrates the connection established between the hydraulic pressure circuit of the first manual valve and that of the second manual valve.

Referring to the drawing, the first manual valve 253 is provided with a first spool 265 having three lands 265a to 265c. Likewise, the second manual valve 254 is provided with a second spool 266 having six lands 266a to 266f.

The first manual valve 253 is provided with ports a to c, an EX port, a PL port and a D port formed therein, while the second manual valve 254 is provided with an EX port, ports d to f, and L port, an S port, an R port and a D port formed therein. The above-described ports a and d, ports b and e and ports c and f are respectively connected to each other via corresponding oil passages.

Figure 13:
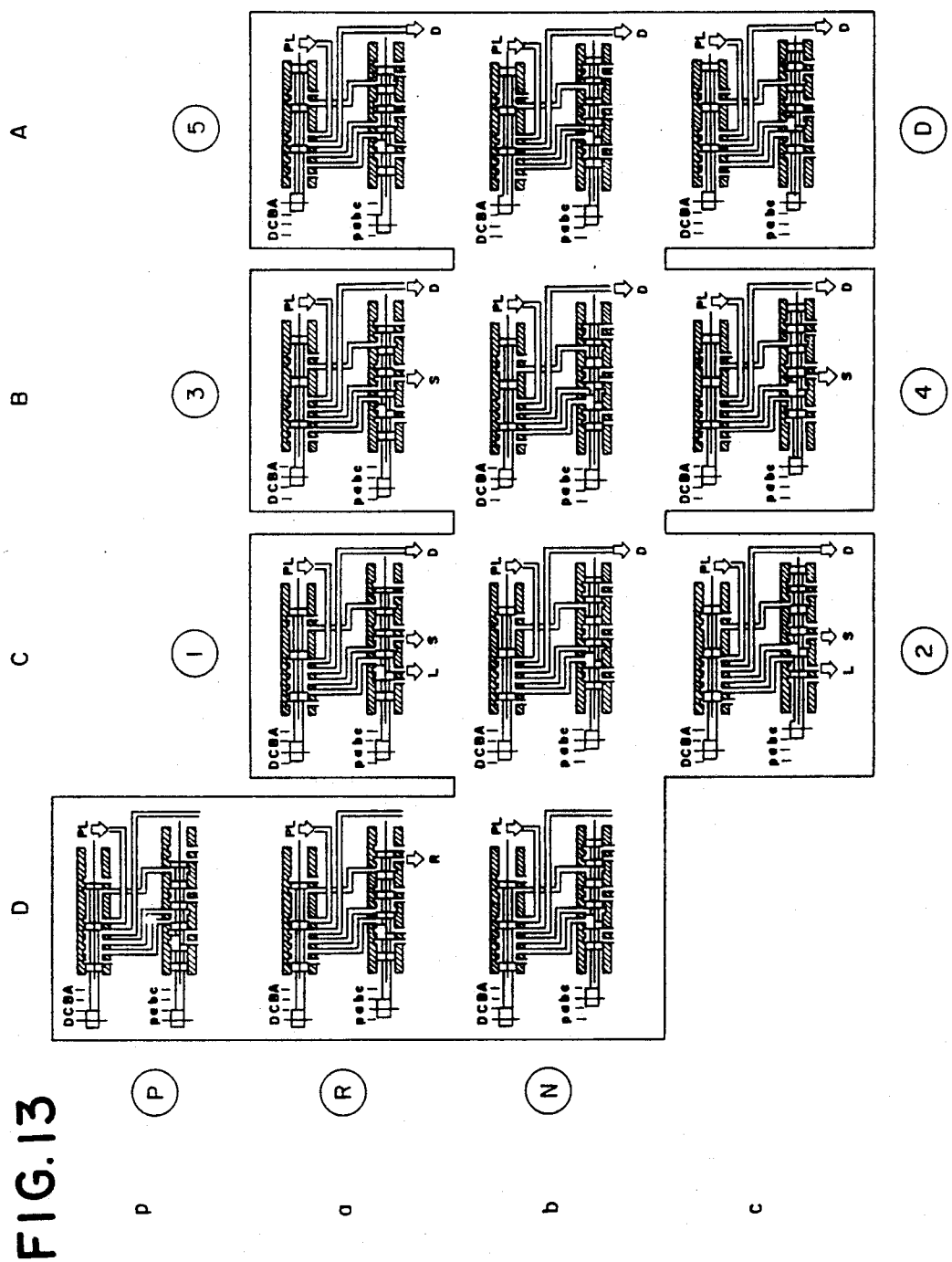
FIG. 13 illustrates the positions of the first manual valve and the second manual valve in various gear rations, P, R and N.

The above-described first and second spools 265 and 266 are arranged to position as shown in FIG. 13 in accordance with the corresponding range and the gear ratio.

Referring to FIG. 13, the state of the first manual valve 253 and that of the second manual valve 254 which correspond to the ranges and the gear ratios will be described.

Referring to the drawing, encircled symbols denote the ranges and gear ratios, and the positions of the first manual valve 253 and that of the second manual valve 254 which correspond to the ranges and the gear ratios are illustrated.

The thus constituted manual valve switching action generation means has two manual valves 253 and 254 so that range pressures for the corresponding ranges are generated. In the case of a structure having one manual valve, when, for example, the range N or the range D is shifted to the range L, the pressure for the range L cannot immediately be generated since the position of the spool is always shifted via the range S in the manual valve. However, according to this embodiment, each of the range pressures is generated by the combination of the two manual valves 253 and 254. Therefore, the shifting can immediately be performed.

Figure 1:
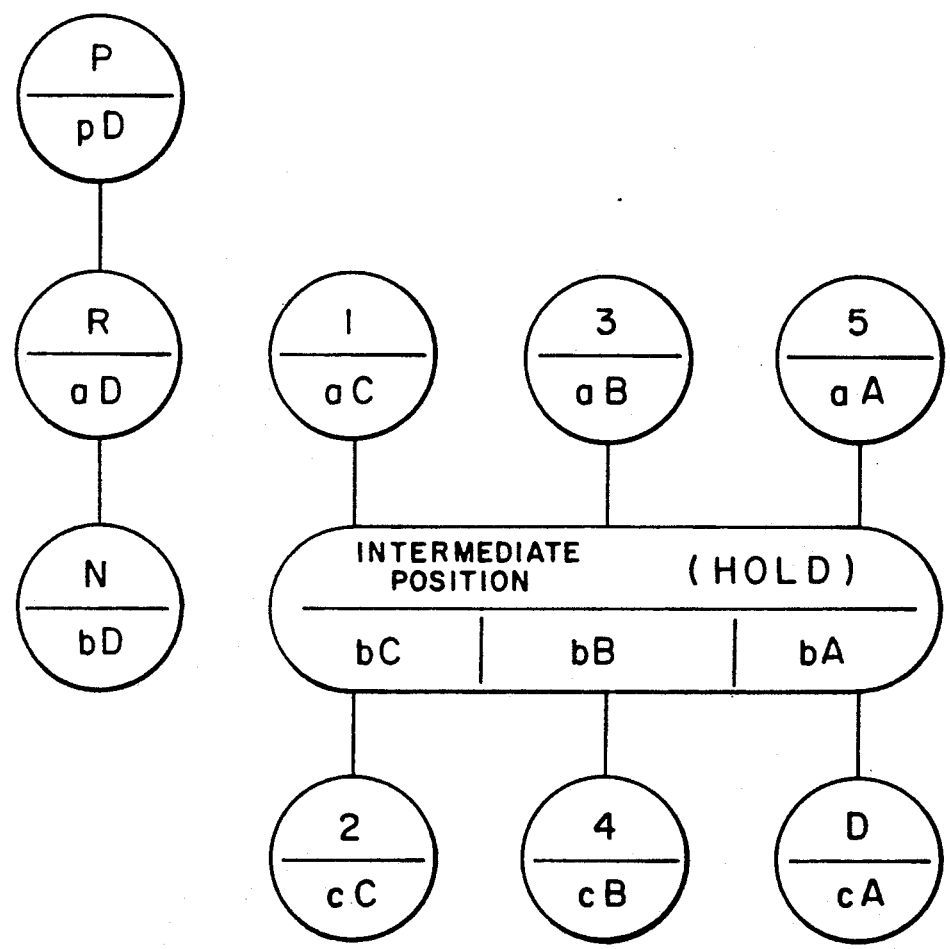
FIG. 1 illustrates a shift pattern and the options available therein with an on/off switch and a manual valve switching action generation means of a twin manual valve type.

FIG. 1 shows the effect of the switch switched on/off when the shift lever 101 has a guide plate with the third pattern and using a manual valve switching action generation means of a twin manual valve type.

Referring to the drawing, symbols in the upper stages in the encircled portions denote the ranges and gear ratios which correspond to the shift positions of the shift lever 101. On the other hand, symbols in the lower stages in the encircled portions denote the contact of the contacts A to D and contacts p and a to c shown in FIG. 9 which are respectively switched on in accordance with the shift positions.

Furthermore, at each of the intermediate positions between the gear ratios, the structure allows the switch to select maintaining the previous gear ratio.

The correlation between contacts A to D, p and a to c being turned on and the positions of the two manual valves 253 and 254 are shown in such a manner that they correspond to the positions of the symbols A to D and symbols p and a to c shown in FIG. 13.

In order to prevent shock due to the transmission operation and the deterioration in the life of the frictional engagement elements resulting from jump shifting and in order to quickly complete the transmission operation, the structure is arranged in such a manner that, when the shift lever 101 is released from the highest or the lowest gear shift position, the intermediate gear ratio is immediately established.

In order to achieve this, when a driver operates the shift lever 101 during the driving of the vehicle at the fifth speed, a braking device is operated simultaneously with the start of the movement of the shift lever 101 in the groove 108c so that a solenoid valve is brought to an ON/OFF state of the fourth speed. When the driver operates the shift lever 101 during the driving of the vehicle at the first speed, the braking device is operated simultaneously with the start of the movement of the shift lever 101 in the groove 106c so that the solenoid valve is brought to an ON/OFF state of the second speed.

Therefore, if the gear ratio is shifted from the fifth speed to the third speed in the jump manner, the gear ratio is always brought to the third speed via the fourth speed. Furthermore, if the intent is to shift from the first speed to the third speed in a jump manner, the gear ratio is always brought to the third speed via the second speed.

Figure 14:
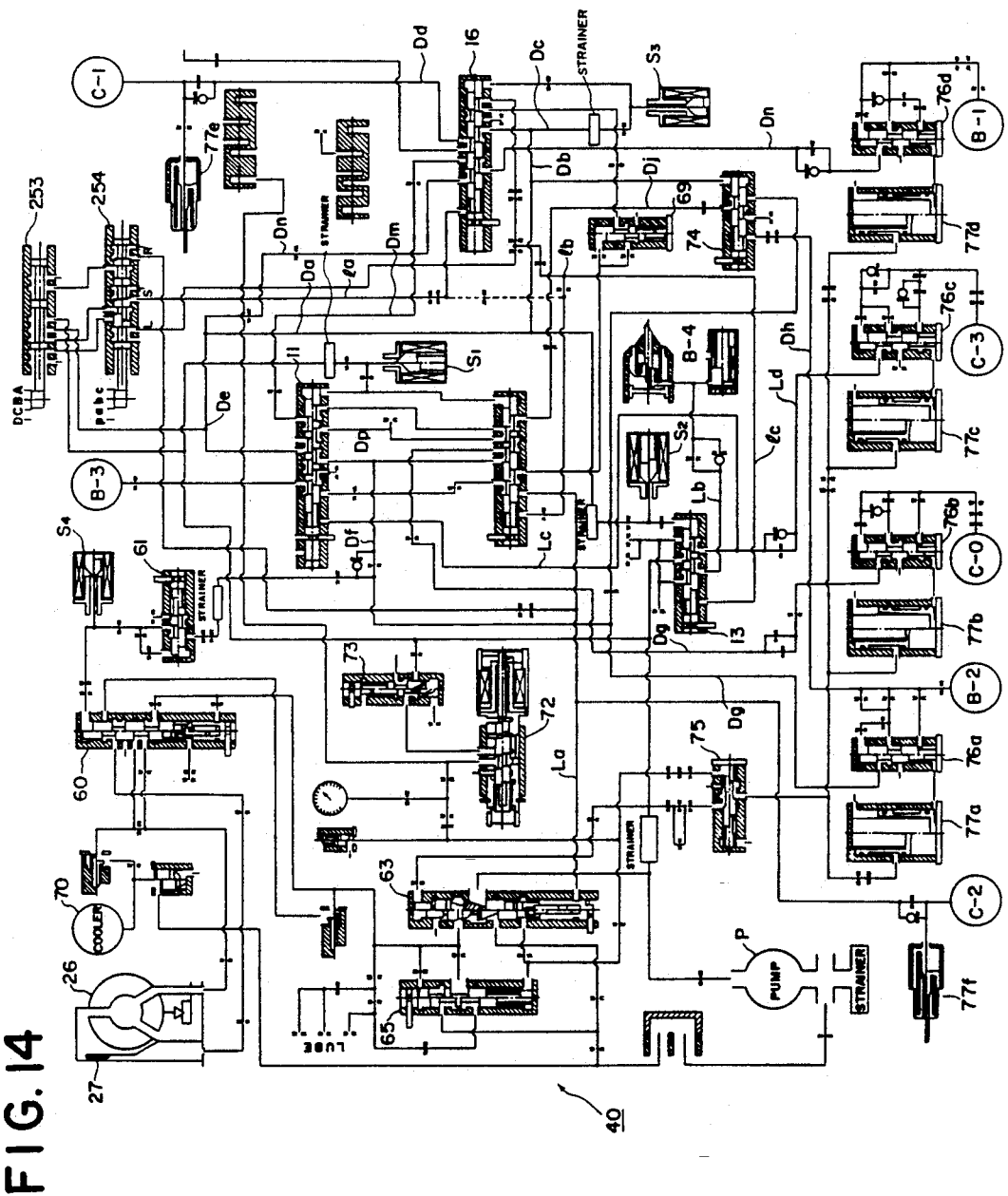
FIG. 14 a hydraulic pressure circuit diagram for an automatic transmission for a vehicle which employs the twin manual valve type manual valve switching action generation means.

FIG. 14 illustrates the hydraulic pressure circuit for the automatic transmission for a vehicle which employs the twin manual valve type manual valve switching action generation means.

A fifth speed automatic transmission 21 is arranged in such a manner that each of the contacts A to D, p and a to c is selectively turned on in accordance with the range selected by the manual valves 253 and 254. Then, first to fourth solenoids $S_1$, $S_2$, $S_3$ and $S_4$ of a hydraulic pressure circuit 40 are operated as shown in FIG. 15. As a result, the clutches $C_0$ to $C_3$, brakes $B_1$ to $B_4$ and one-way clutches $F_0$ to $F_3$ are operated as previously determined, causing any of the ranges P, R, D, S, L and gear ratios first to fifth speeds to be obtained.

That is, when the driver operates the shift lever 101 so that it is positioned to the groove 111c of the third pattern, the D-range is selected.

When the gear ratio is at the first speed state (1ST) in the D-range, the first solenoid valve S1 is turned off so that the oil supply state is established, the second solenoid valve S2 is turned on so that the drain state is established and the third solenoid valve S3 is turned off so that the drain state is established. Therefore, a 1-2 shift valve 11 and a 3-4 shift valve 12 are positioned at the upper half positions, while a 2-3 shift valve 13 and a 4-5 shift valve 16 are positioned at the lower half positions.

In this state, the line pressure is supplied through the port D of the second manual valve 254 to a first clutch hydraulic pressure servo $C_1$ via oil passages Da and Db and oil passages Dc and Dd for the 4-5 shift valve 16. Furthermore, line pressure $P_L$ of the line pressure oil passage La is supplied to a fourth brake hydraulic pressure servo $B_4$ via the port of the 2-3 shift valve 13 and the oil passage Le. As a result, the automatic transmission 21 acts in such a manner that the first clutch $C_1$ is engaged and the fourth brake $B_4$ is engaged.

At this time, the rotation of an input shaft 29 is transmitted to the ring gear $R_1$ of the single planetary gear unit 30 via the first clutch $C_1$. In this state, since the rotation of the ring gear $R_2$ of the dual planetary gear unit 31 is stopped by the second one-way clutch $F_2$, the common carrier CR rotates at a considerably decelerated speed in the forward direction while idly rotating the sun gear S in the reverse direction. As a result, the above-described rotation is transmitted from the counter drive gear 32 to the counter driven gear 35 of the U/D mechanism portion 25. In the U/D mechanism portion 25, the fourth brake $B_4$ and the forth one-way clutch $F_3$ are operated. As a result, both the four speed automatic transmission mechanism portion 23 in the first speed state and the U/D mechanism portion 25 are operated so that the first speed is established as the overall output of the automatic transmission 21.

The second speed state (2ND) in the D-range will next be described. In first speed, the first solenoid valve S1 is turned on so that the drain state is established. As a result, the 1-2 shift valve 11 and the 3-4 shift valve 12 are switched to the lower half positions, causing the line pressure through the port D of the second manual valve 254 to be supplied to the second brake hydraulic servo $B_2$ via oil passages De, Df and Dg. Therefore, the second brake $B_2$ is engaged in this state as well as the engagement of the first clutch $C_1$.

Since the second brake $B_2$ is engaged, a $B_1$ sequence valve 74 is positioned at the upper half position via an oil passage Dh so that the oil passages Dg and Dj are communicated with each other. Thus, the first brake hydraulic servo $B_1$ is operated via oil passages Dk, Dm and Dn.

Therefore, as a result of the engagements of the first one-way clutch $F_1$ and the first brake $B_1$ due to the action of the second brake $B_2$, the rotation of the sun gear S is stopped. Therefore, the rotation of the ring gear $R_1$ transmitted from the input shaft 29 causes the carrier CR to be rotated in a decelerated manner in the forwardly direction while idly and forwardly rotating the ring gear $R_z$ of the dual planetary gear unit 31. The above-described rotation is transmitted to the counter driven gear 35 of the U/D mechanism portion 25 via the counter driven gear 32. Then, both the four speed automatic transmission mechanism portion 23 in the second speed state and the U/D mechanism portion 25 are operated so that the second speed is obtained as the overall output of the automatic transmission 21.

In order to establish the third speed state (3RD) in the D-range, the second solenoid valve S2 is turned off in the second speed state so that it is changed to the oil supply state. Then, the 2-3 shift valve 13 is switched to the upper half position, causing the line pressure of the line pressure oil passage La to act on the left side control oil chamber of the 1-2 shift valve 11 via the oil passage Lc. Furthermore, the line pressure of the line pressure oil passage La is supplied to the fourth clutch hydraulic servo $C_3$ via the 2-3 shift valve 13 and the oil passage Ld. Furthermore, the fourth brake hydraulic servo $B_4$ is drained via the drain port of the 2-3 shift valve 13. As a result, the fourth brake $B_4$ is released and the fourth clutch $C_3$ is engaged while maintaining the four speed automatic transmission mechanism portion 23 in the second speed state. As a result, the U/D mechanism portion 25 is brought to the directly connected state. Therefore, the second speed state of the automatic transmission mechanism portion 23 and the directly connected state of the U/D mechanism portion 25 are combined to each other. As a result, the overall automatic transmission 21 establishes the third speed.

The fourth speed state (4TH) in the D-range is established in such a manner that the first solenoid valve S1 is turned off in the third speed state so that the oil supply state in established. As a result, the line pressure acts on the right control oil chamber of the 3-4 shift valve 12, causing the 3-4 shift valve 12 to be switched to the upper half position. Although the line pressure acts on the right control oil chamber of the 1-2 shift valve 11, the line pressure is also acting on the left control oil chamber at this time. Therefore, it is combined with the urging force of the spring, causing the 1-2 shift valve 11 to be retained in the lower half position.

Therefore, the D-range pressure is supplied to the third clutch hydraulic servo $C_0$ via the oil passages De, Dp and Dq. As a result, the third clutch $C_0$ is engaged in addition to the first clutch $C_1$, the fourth clutch $C_3$ and the second brake $B_2$.

At this time, the rotation of the input shaft 29 is transmitted to the ring gear $R_1$ of the single planetary gear unit 30 via the first clutch $C_1$. Furthermore, the same is transmitted to the ring gear $R_2$ of the dual planetary gear unit 31 via the third clutch $C_0$. Therefore, the elements of the two planetary gear units 30 and 31 are integrally rotated so that the rotation which is the same speed as that of the rotation of the input shaft 29 is transmitted from the carrier CR to the counter drive gear 32. The rotation of the counter drive gear 32 is combined with the directly connected state of the U/D mechanism portion 25 so that the four speed output which is the same rotation speed as that of the rotation of the input shaft 29 is obtained from the output pinion 36.

The fifth speed state (5TH) in the D-range is established in such a manner that the third solenoid S3, turned on in the fourth speed state so that it is brought to the oil supply state. As a result, the 4-5 shift valve 16 is switched to the upper half position, causing the first clutch hydraulic servo $C_1$ to be drained via the drain port. Furthermore, the line pressure of the port D of the second manual valve 254 is supplied to the first brake hydraulic servo $B_1$ via the oil passages Dr and Dn so that the first brake $B_1$ is engaged.

At this time, the rotation of the input shaft 29 is transmitted to the ring gear $R_2$ of the dual planetary gear unit 31 via the third clutch $C_0$. Since the sun gear S has been stopped in this state, the carrier CR rotates at high speed while idly rotating the ring gear $R_1$ of the single planetary gear unit 30. The above-described high speed rotation is, as a O/D rotation, transmitted to the counter drive gear 32. The O/D rotation acts together with the U/D mechanism portion 25 which has been brought to the directly connected state so that the fifth speed is established as the overall speed of the automatic transmission 21.

To provide fail-safe control during the above-described D-range driving, the first solenoid valve S1 is turned off so that it is brought to an oil supply state, the second solenoid valve S2 is turned off so that it is brought to an oil supply state and the third solenoid valve S3 is turned off so that it is brought to a drain state. Furthermore, the 1-2 shift valve 11 and the 4-5 shift valve 16 are brought to the lower half positions, while the 2-3 shift valve 13 and the 3-4 shift valve 12 are brought to the upper half positions. As a result, the first clutch C, is engaged and the first brake $B_1$ is released so that the fourth speed state is established.

When the shift lever 101 is positioned to the groove 104c formed in the guide plate 102 (see FIG. 5), the hydraulic pressure similar to the state of the D-range is established, as shown in FIG. 13, at all positions except for the left end portion of the groove 104c regardless of the positions of the first and second manual valves 253 and 254.

When the shift lever 101 is positioned in the groove 108c the fifth speed is selected where, similar to the fifth speed state in the D-range, the third clutch $C_0$, the fourth clutch $C_3$, the first brake $B_1$ and the second brake $B_2$ are engaged so that the fifth speed state is established. For fail-safe control, the fourth speed state is established wherein, similar to D-range driving in the manual valves 253 and 254, the spools are shifted to the position at which the S-range pressure can be generated as well as the D-range pressure.

When the shift lever 101 is positioned in the groove 110c, the fourth speed driving range is selected wherein, similar to the fourth speed state in the D-range, the first clutch $C_1$, the third clutch $C_0$, the fourth clutch $C_3$, and the second brake $B_2$ are engaged so that the fourth speed state is established. For fail-safe control, the fourth speed state is established similar to the D-range mode.

When the shift lever 101 is positioned in the groove 107c, the third speed is selected wherein, similar to the third speed state in the D-range, the first clutch $C_1$, the fourth clutch $C_3$, the first brake $B_1$ and the second brake $B_2$ are engaged so that the third speed state is established.

For fail-safe control at this time, the first solenoid valve S1, the second solenoid valve S2 and the third solenoid valve S3 are turned off. However, each of the clutches and the brakes is respectively brought to the same engagement/release states as in the fourth speed state in the D-range.

When the shift lever 101 is positioned in the groove 109c, the second speed is selected where in the manual valves 253 and 254, the spool is shifted to the position at which the L-range pressure is generated as well as the D-range pressure.

The on/off states of the solenoid valves S1 to S3 are the same as in the second speed state in the D-range so that the first clutch $C_1$, the first brake $B_1$ and the second brake $B_2$ are respectively engaged. As a result, the second speed state is established. However, the hydraulic pressure through the L-port of the first manual valve 253 is supplied to the left oil control chamber of the 2-2 shift valve 13 via oil passages 1a, 1b and 1c, causing the 2-3 shift valve 13 to be held at the lower half position. As a result, shifting to the third speed is prevented.

When the fail-safe control state is established at this time, the first solenoid valve S1, the second solenoid valve S2 and the third solenoid valve S3 are turned off. However, the engaged/released states of each of the clutches and the brakes are as in first speed driving in the D-range.

When the shift lever 101 is positioned in the groove 106c, the first speed driving range is selected.

The on/off states of each of the solenoid valves S1 to S3 are the same as in first speed driving in the D-range. Therefore, the first clutch $C_1$ and the third clutch $B_3$ are respectively engaged so that the first speed state is established.

When the fail-safe control state is established at this time, the first solenoid valve S1, the second solenoid valve S2 and the third solenoid valve S3 are turned off. However, each of the clutches and the brakes are brought to the same engagement/release state as in first speed driving mode in the D-range.

In the N-range at the left end portion of the groove 104c and the P-range in the groove 105c, no hydraulic pressure is supplied from the first and second manual valves 253 and 254. The first solenoid valve S1 is turned off so that it is brought to the oil supply state, the second solenoid valve S2 is turned on so that it is brought to the drain state and the third solenoid valve S3 is turned off so that it is brought to the drain state. Therefore, the 1-2 shift valve 11 and the 3-4 shift valve 12 are brought to the upper half positions, while the 2-3 shift valve 13 and the 4-5 shift valve 16 are brought to the lower half positions. As a result, the line pressure from the oil passage La is supplied to the fourth brake hydraulic servo $B_4$ via the oil passage Le.

When the range is switched from the N-range to the R-range, the second clutch $C_2$ is connected and as well as the third brake $B_3$ is operated in the case where the wheels of the vehicle are stopped or the vehicle is driven at first speed. As a result, the rotation of the input shaft 29 is transmitted to the sun gear S via the second clutch $C_2$. However, since the ring gear $R_2$ of the dual planetary gear unit 31 has been secured by the action of the third brake $B_3$ in this state, the carrier CR is rotated reversely while reversely rotating the ring gear $R_1$ of the single planetary gear unit 30. As a result, the above-described reverse rotation of the carrier CR is transmitted from the counter drive gear 32 to the U/D mechanism portion 25.

When the range is switched from the N-range to the R-range, the first solenoid valve S1 is turned on so as to switch the 1-2 shift valve 11 and the 3-4 shift valve 12 and to release the third brake $B_3$ in the case where the vehicle is driving at a speed higher than a predetermined speed. As a result, undesirable shifting to the R-range during the vehicle driving can be prevented.

Figure 5:
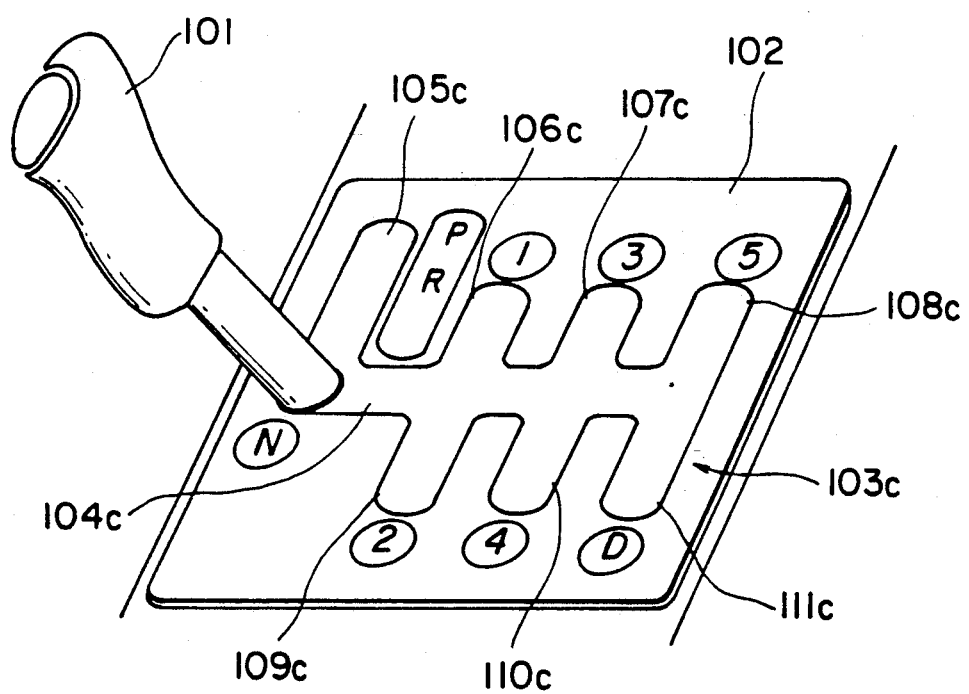
FIG. 5 is a perspective view which illustrates another shift lever.
Figure 6:
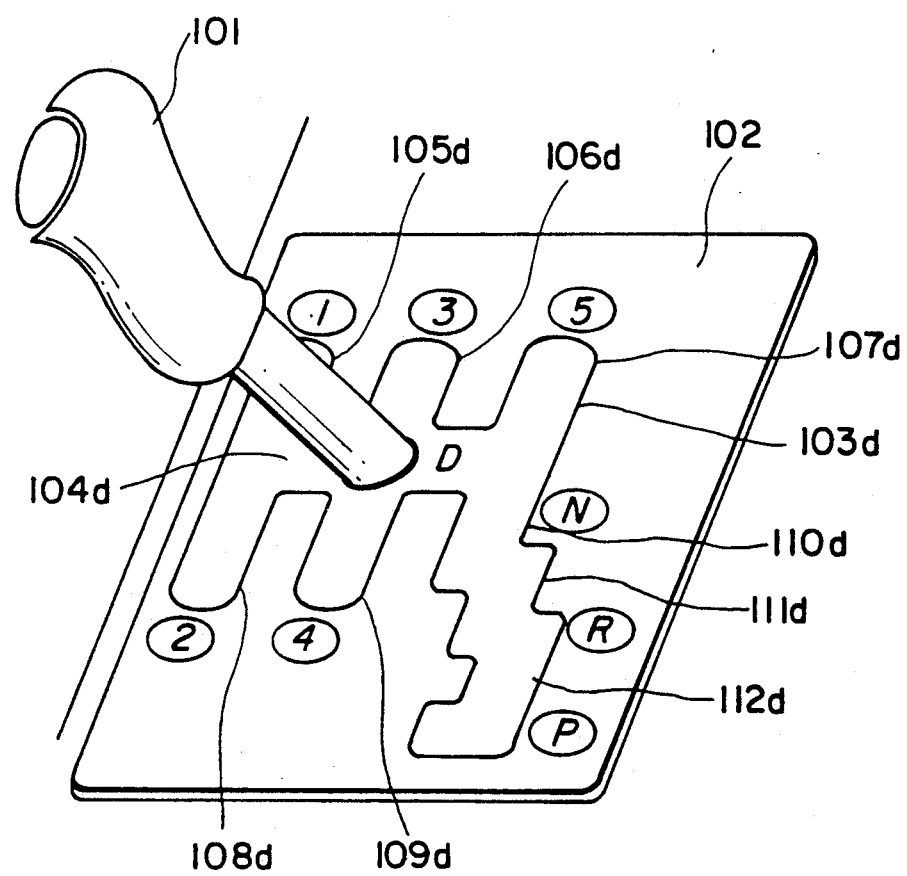
FIG. 6 is a perspective view which illustrates another shift lever.

According to the above-described embodiment, the guide plate 102 as shown in FIG. 5 is provided so as to serve as restriction means for restricting the longitudinal and the lateral movements of the shift lever 101.

According to the above-described twin manual valve manual valve switching action generation means, the above-described restriction means may be provided for the manual valves 253 and 254.

Figure 16A:
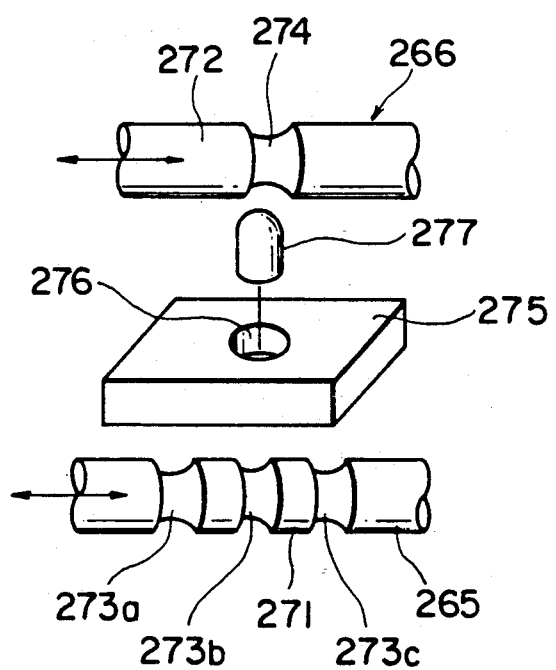
FIG. 16 (A) is an exploded perspective view which illustrates another restriction means.
Figure 16B:
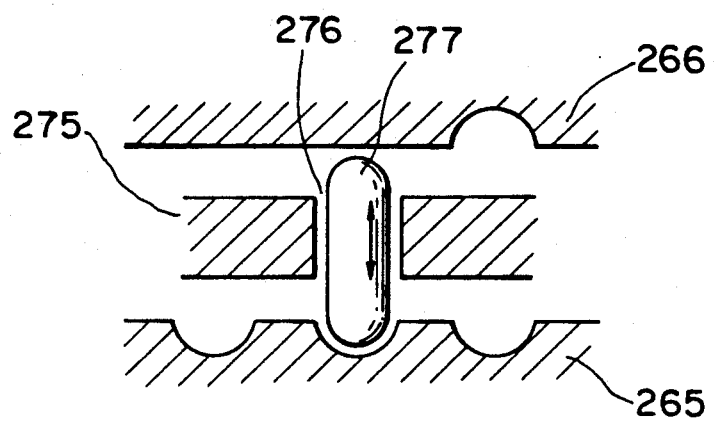

Referring to FIGS. 16(A) and 16(B), cylindrical portions 271 and 272 are formed in the corresponding portion of the spools 265 and 266 in order to restrict the relative actions of the manual valves 253 and 254. The cylindrical portion 271 has grooves 273a, 273b and 273c formed therein, while the cylindrical portion 272 has a groove 274 formed therein.

A pin guide 275 secured to a valve body (omitted from illustration) is disposed in such a manner that it confronts the above-described spools 265 and 266, the pin guide 275 having a pin hole 276 into which a pin 276 is inserted. The length of the pin 276 corresponds to the sum of the clearance between the above-described cylindrical portions 271 and 272 and the depth of any of the grooves 273a, 273b, 273c and 274.

When the pin 276 is engaged in any of the grooves 273a, 273b, 273c or the 274, the movement of each of the spools 265 and 266 is restricted. When either of the spools 265 or 266 cannot move, other elements can move. Therefore, the two spools 265 and 266 cannot be moved simultaneously, thus limiting the movement of the shift lever 101 to a predetermined movement. The spool 266 of the manual valve 254 has one pin hole 274 so that the pin 276 is engaged at only the N-range position. Therefore, the manual valve 253 is fixed at positions except for the above-described N-range position.

Next described is the plate cam type manual valve switching action generation means which provides for movement of the manual valve by a cam formed on the plate.

FIG. 17 illustrates the mechanical structure of the plate cam type manual valve switching action generation means, where FIG. 17 (A) illustrates the shift pattern of the shift lever, FIG. 17 (B) is an X-directional view of FIG. 17 (A), FIG. 17 (C) is a Y-directional view of the same and FIG. 17 (D) is a plan view which shows the cam plate.

Referring to the drawings, reference numeral 121 represents a sphere pivotally supporting the shift lever 101. A first pattern guide plate (omitted from illustration) is disposed above the sphere 121. In accordance with the movement of the shift lever 101 restricted by the above-described first pattern guide plate, a lower end portion 122 of the shift lever 101 moves 180° point-symmetrically and its movement is guided by a gate plate 123 disposed between the sphere 121 and the lower end portion 122. The gate plate 123 has a groove which is arranged to have 180° point-symmetry with respect to the first pattern.

The movement of the lower end portion 122 of the shift lever 101 is restricted by the guide plate and the gate plate 123. As a result of the movement of the lower end portion 122, a cam plate 124 disposed adjacent to the lower end portion 122 is moved in a following manner.

The cam plate 124 has a cam groove 125 for converting the movement of the lower end portion 122 of the shift lever 101 into a linear movement, the thus established linear movement is transmitted to the manual valve via a linkage 126.

The above-described cam groove 125 is arranged in such a manner that grooves 132, 133 and 134 extend downwards from a lateral groove 131 and grooves 135, 136 and 137 extend upwards from the same.

Figure 3:
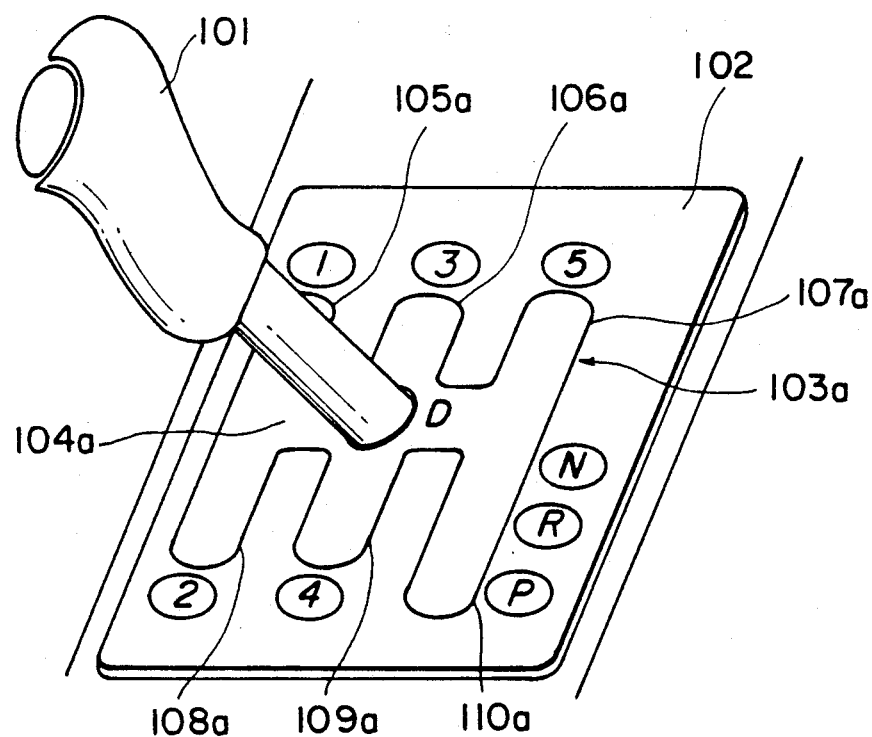
FIG. 3 is a perspective view which illustrates a shift lever for the automatic transmission for a vehicle according to the present invention.

Since the cam groove 125 is, as described above, formed so as to receive the lower end portion 122 of the shift lever 101, with the lower end portion 122 moving along the groove 132 formed in the cam plate 124 when the shift lever 101 is moved along the groove 105a formed in the guide plate 102 shown in FIG. 3.

Similarly, when the shift lever 101 is moved along any of the grooves 106a, 107a, 108a, 109a and 110a, the lower end portion 122 is moved along the corresponding grooves 133, 134, 135, 136 and 137.

The above-described grooves 132 and 135 are formed in such a manner that they extend from the groove 131 to the right at an angle of about 50°, the groove 137 extends to the left at an angle of about 50°, the groove 133 extends to the right at an angle of about 70°, and the grooves 134 and 136 extend perpendicularly. When the lower end portion 122 of the shift lever 101 is moved along any of the grooves 132, 135 and 137, the cam plate 124 is moved a considerable distance. When the same is moved along the groove 133, the cam plate 124 is moved by a small distance. When the same is moved along either the groove 134 or 136, the cam plate 124 is not moved.

Although the groove 137 is illustrated in FIG. 17 (D), a feeling of reliable shifting can also be obtained if a front end portion 137a of the groove 137 is bent so as to form a bent portion 137b. That is, when the bent portion 137b is formed, the lower end portion 122 of the shift lever 101 encounters resistance at the final stage of the movement. Therefore, the operation touch can be reduced at the time of the start of the movement and the same can be made heavier at the time of the last stage of the movement.

Furthermore, if the shape of the cam groove 125 is a plurality of lines at a variety of angles are connected to one another or if it is formed as curves, a shifting touch suitable for shape can be obtained.

Since a variety of shift patterns for the manual valve switching action generation means can be formed by only changing the shape and the configuration of the cam groove 125, the manual valve switching action generation means according to this embodiment can be mounted.

FIG. 18 illustrates the positioning of the cam plate, where FIG. 18 (A) illustrates the position of the cam plate in first speed, FIG. 18 (B) illustrates the position of the same in second speed, FIG. 18 (C) illustrates the position of the same in third speed, FIG. 18 (D) illustrates the position of the same in fourth speed, FIG. 18 (E) illustrates the position of the same in fifth speed and FIG. 18 (F) illustrates a state of the same at the R-range.

Symbols L, S, D, N and R shown below in the lower portion of each of the drawings illustrate the position of the spool of the manual valve which corresponds to the state of the cam plate 124, that is, the generated range pressure. For example, in the case shown in FIG. 18 (A), the lower end portion 122 of the shift lever 101 is positioned in the groove 132. It can be understood that the spool of the manual valve is placed at a position at which the L-range pressure is generated as indicated by the symbol L disposed at the downward extended portion at the left end portion 138 of the cam plate 124.

Similarly, FIG. 18 (B) illustrates the position of the shift lever when the L-range pressure is generated, FIG. 18 (C) illustrates the position of the same when the S-range pressure is generated, FIG. 18 (D) and (E) illustrate the position of the same when the D-range pressure is generated and FIG. 18 (F) illustrates the position of the same when the R-range pressure is generated. Referring to the drawings, the L-range pressure is generated at the first speed and the second speed states and the D-range pressure is generated at the fourth and the fifth speed states. Each of the gear ratios is established by other valves and the position of the manual valve is maintained as is.

Therefore, a switch is provided at each shift position and is arranged to be switched on when the shift lever 101 is placed at that shift position and switched off when the shift lever 101 is released from that shift position. As a result of the operation of the switch, the solenoid of the hydraulic pressure circuit can be selectively turned on/off, causing each of the valves provided for the hydraulic pressure circuit to be operated.

Figure 4:
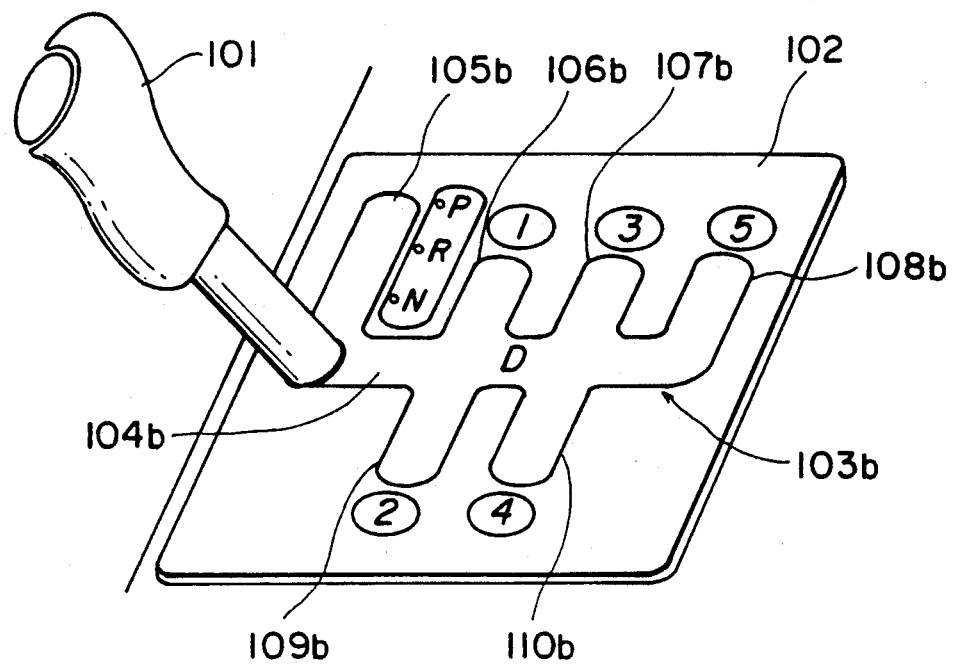
FIG. 4 is a perspective view which illustrates another shift lever.

In the case where the shift lever 101 is shifted in accordance with the first pattern, the manual valve position is designated by the symbol disposed in the vicinity of the encircled symbol shown in FIG. 4.

The intermediate position 139 which is not any of the shift positions, provides the D-range state in the case of the plate cam type structure. Therefore, when the shift lever 101 is placed at the intermediate position 139, the vehicle can be driven in the automatic transmission mode.

In order to prevent the D-range from being selected simultaneously with the movement of the shift lever 101 to the above-described intermediate position 139 in the case where the gear position is intended to be changed to another shift position, there is provided means for determining whether or not a driver is touching the shift knob of the shift lever 101.

In the case where the solenoid valve or the like provided for the purpose of selecting one of the gear ratios cannot work as desired due to a failure of the control device or noise, fail-safe control is performed. In this case, the parenthesized gear ratio shown to the side of the symbol showing the manual valve position shown in FIG. 17 is established. In this case, the second speed is established during the driving at the first speed or the second speed, the third speed is established during the driving at the third speed, the N-range is established during the driving at the fourth or the fifth speed and the R-range is established during the reverse directional driving. That is, a gear ratio which approximates the driving state immediately before the fail-safe control is performed and shock can be reduced as much as possible is selected.

Therefore, even if there is no electric signal, the vehicle can be driven since the gear ratio can be shifted in the second or the third speed.

In order to prevent shock generated due to the gear changing without diminishing the durability of the frictional engagement elements, the shifting to the intermediate gear ratio is commenced immediately after releasing the shift lever 101 from the shift position of the highest or the lowest speed state.

Therefore, when a driver operates the shift lever 101 during the driving at the fifth speed, the control device is operated simultaneously with the commencement of the movement of the shift lever 101 in the groove 107a. As a result, each of the solenoid valves S1 to S3 is turned on/off at the fourth speed. On the other hand, when the driver operates the shift lever 101 during the driving at the first speed, the control device is operated simultaneously with the commencement of the movement of the shift lever 101 in the groove 105a. As a result, each of the solenoid valves S1 to S3 is turned on/off at the second speed.

Therefore, if the fifth speed is shifted to the third speed in the jump manner, the speed state is always shifted to the third speed via the fourth speed. If the first speed is jumped to the third speed, the speed state is always shifted to the third speed via the second speed.

Figure 19:
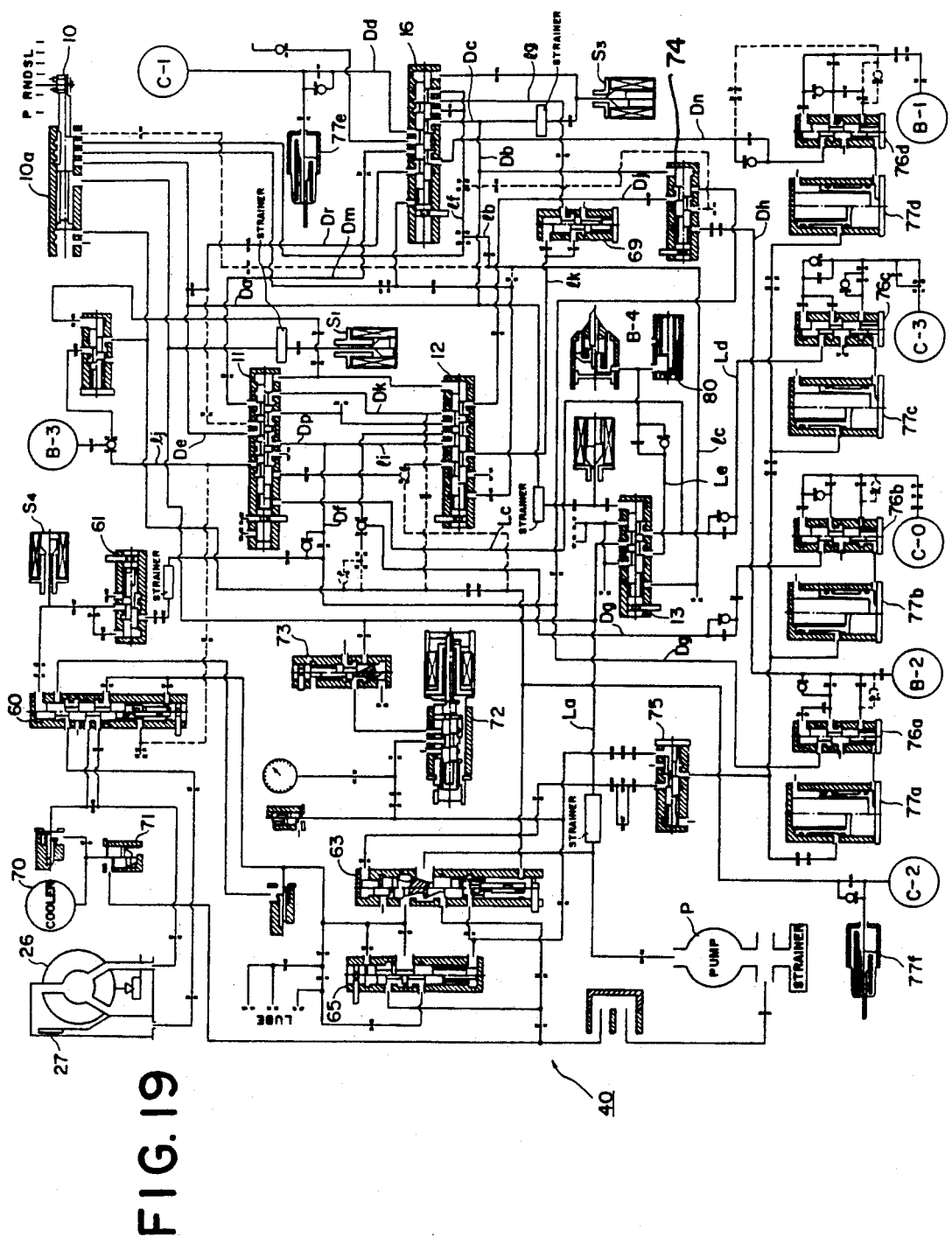
FIG. 19 is a hydraulic pressure circuit diagram for an automatic transmission for a vehicle which employs the plate cam type manual valve switching action generation means.

FIG. 19 illustrates the hydraulic pressure circuit for the automatic transmission for a vehicle according to the present invention and arranged to employ the above-described plate cam type manual valve switching action generation means.

In the hydraulic pressure circuit 40, symbols $C_0$, $C_1$, $C_2$, and $C_3$ represent clutch hydraulic servos shown in FIG. 2 and $B_1$, $B_2$, $B_3$ and $B_4$ represent brake hydraulic servos. Reference numeral 10 represents a manual valve, 10a represents a spool which moves in the manual valve 10 so as to provide each of the range pressures. Reference numeral 11 represents a 1-2 shift valve which constitutes the first shift valve, 12 represents a 3-4 shift valve which constitutes the second shift valve, 13 represents a 2-3 shift valve which constitutes the third shift valve, and 16 represents a 4-5 shift valve.

Symbol S1 represents a first solenoid valve for controlling the 1-2 and 3-4 shift valves 11 and 12, S2 represents a second solenoid valve for controlling the 2-3 shift valve 13 and S3 represents a third solenoid valve for controlling the 4-5 shift valve 16.

Reference numeral 60 represents a lockup control valve and symbol S4 represents a fourth solenoid valve for controlling the duty ratio of the fourth lockup control valve 60. Reference numeral 61 represents a lockup modulator valve for stabilizing the duty ratio control performed by the solenoid valve S4.

Reference numeral 63 represents a primary regulator valve, 65 represents a secondary regulator valve and 69 represents a low modulator valve. Reference numeral 70 represents a cooler, 71 represents a cooler bypass valve and 72 represents a throttle valve comprising a linear solenoid for freely controlling the hydraulic pressure. Reference numeral 73 represents a solenoid modulator valve and 74 represents a $B_1$ sequence valve. Reference numeral 75 represents an accumulator control valve, 26 represents a torque converter, 27 represents a lockup clutch and symbol P represents a hydraulic pressure pump.

The above-described second brake hydraulic servo $B_2$, the third clutch hydraulic servo $C_0$, the fourth clutch hydraulic servo $C_3$ and the first brake hydraulic servo $B_1$ are respectively provided with relief valves 76a, 76b, 76c and 76d and accumulators 77a, 77b, 77c and 77d. Furthermore, the first clutch hydraulic servo $C_1$ and the second clutch hydraulic servo $C_2$ are provided with accumulators 77e and 77f. An accumulator 80 disposed in the case is in communication with the fourth brake hydraulic servo $B_4$.

Referring to FIG. 19, condenser like symbols interposed in the oil passage denote the capability of shutting the oil passage by using a separation plate. In this case, the thus formed structure is able to be used as well as a valve body for a four speed automatic transmission.

Then, in the operation of the automatic transmission for a vehicle which employs the above-described plate cam type manual valve switching action generation means according to the present invention, the movement of the cam plate 124, responsive to operation of the shift lever 101 is transmitted to the manual valve 10 (see FIG. 19) via the linkage 126.

In the automatic transmission 21 constituted like this, the first to fourth solenoids S1, S2, S3 and S4 in the hydraulic pressure control circuit 40 is operated in the range corresponding to the range selected by manual valve 10 in accordance with the operation chart shown in FIG. 20. As a result, each of the clutches $C_0$ to $C_3$, brakes $B_1$ to $B_4$ and one-way clutches $F_0$ to $F_3$ operates as predetermined so that any of the first to fifth speeds in each of the driving ranges P, R, D, S and L can be obtained.

That is, when a driver operates the shift lever 101 so as to move it to the groove 104a of the first pattern, the D-range is selected.

In the first speed (1ST) state in the D-range, the first solenoid valves S1 is turned on so that it is in the oil supply state, the second solenoid valve S2 is turned on so that it is in the drain state and the third solenoid valve S3 is turned on so that it is in the drain state. Therefore, the 1-2 shift valve 11 and the 3-4 shift valve 12 are positioned in the upper half positions and the 2-3 shift valve 13 and the 4-5 shift valves 16 are positioned in the lower half positions.

In this state, the line pressure from the port D of the manual valve 10 is supplied to the first clutch oil servo $C_1$ via the oil passages Da and Db, the oil passage Dc of the 4-5 shift valve 16 and the oil passage Dd. Furthermore, the line pressure $P_L$ of the line pressure passage La is supplied to the fourth brake hydraulic servo $B_4$ via the port of the 2-3 shift valve 13 and the oil passage Le. As a result, the first clutch (forward) $C_1$ is engaged and the fourth brake $B_4$ is as well as engaged.

At this time, the rotation of an input shaft 29 is transmitted to the ring gear $R_1$ of the single planetary gear unit 30 via the first clutch $C_1$. Since the rotation of the ring gear $R_2$ of the dual planetary gear unit 31 is stopped by the second one-way clutch $F_2$, the common carrier CR rotates at a considerably decelerated speed in the forward direction while idly rotating the sun gear S in the reverse direction. As a result, the above-described rotation is transmitted from the counter drive gear 32 to the counter driven gear 35 of the U/D mechanism portion 25. In the U/D mechanism portion 25, the fourth brake $B_4$ and the fourth one-way clutch $F_3$ are operated. As a result, both the four speed automatic transmission mechanism portion 23 in the first speed state and the U/D mechanism portion 25 are operated so that the first speed state is established as the overall output of the automatic transmission 21.

The second speed state (2ND) in the D-range will now be described. At the first speed state, the first solenoid valve S1 is turned off so that the drain state is established. As a result, the 1-2 shift valve 11 and the 3-4 shift valve 12 are switched to the lower half positions, causing the line pressure through the port D of the second manual valve 10 to be supplied to the second brake hydraulic servo $B_2$ via the oil passages De, Df and Dg. Therefore, the second brake $B_2$ is engaged in this state in addition to the engagement of the first clutch $C_1$.

Since the second brake $B_2$ is engaged, the B1 sequence valve 74 is positioned at the upper half position via the oil passage Dh so that the oil passages Dg and Dj are communicated with each other. Thus, the first brake hydraulic servo $B_1$ is operated via the oil passages Dk, Dm, and Dn.

Therefore, as a result of the engagements of the first one-way clutch $F_1$ and the first brake $B_1$ due to the action of the second brake $B_2$, the rotation of the sun gear S is stopped. Therefore, the rotation of the ring gear $R_1$ transmitted from the input shaft 29 causes the carrier CR to be rotated in a decelerated manner in the forward direction while idly and forwardly rotating the ring gear $R_2$ of the dual planetary gear unit 31. The above-described rotation is transmitted to the counter driven gear 35 of the U/D mechanism portion 25 via the counter driven gear 32. Then, both the four speed automatic transmission mechanism portion 23 in the second speed state and the U/D mechanism portion 25 are operated so that the second speed is obtained as the overall output of the automatic transmission 21.

In order to establish the third speed state (3RD) in the D-range, the second solenoid valve S2 is turned off in the second speed state so that it is changed to the oil supply state. Then, the 2-3 shift valve 13 is switched to the upper half position, causing the line pressure of the line pressure oil passage La to act on the left side control oil chamber of the 1-2 shift valve 11 via the oil passage Lc. Furthermore, the line pressure of the line pressure oil passage La is supplied to the fourth clutch hydraulic servo $C_3$ via the 2-3 shift valve 13 and the oil passage Ld. Furthermore, the fourth clutch hydraulic servo $B_4$ is drained via the drain port of the 2-3 shift valve 13. As a result, the fourth brake $B_4$ is released and the fourth clutch $C_3$ is engaged while maintaining the four speed automatic transmission mechanaism portion 23 in the second speed state. As a result, the U/D mechanism portion 25 is brought to the directly connected state. Therefore, the second speed state of the fourth automatic transmission mechanism portion 23 and the directly connected state of the U/D mechanism portion 25 are combined to each other. As a result, the total automatic transmission 21 establishes the third speed.

The fourth speed state (4TH) in the D-range is established in such a manner that the first solenoid valve S1 turned on in the third speed state so that the oil supply state is established. As a result, the line pressure acts on the right control oil chamber of the 3-4 shift valve 12, causing the 3-4 shift valve to 12 to be switched to the upper half position. Although the line pressure acts on the right control oil chamber of the 1-2 shift valve 11, the line pressure has also been acting on the left control oil chamber at this time. Therefore, it is combined with the urging force of the spring, causing the 1-2 shift valve 11 to be restricted to the lower half position.

Therefore, the D-range pressure is supplied to the fourth clutch hydraulic servo $C_0$ via the oil passages De, Dp and Dq. As a result, the third clutch $C_0$ is engaged in addition to engagement of the first clutch $C_1$, the fourth clutch $C_3$ and the second brake $B_2$.

At this time, the rotation of the input shaft 29 is transmitted to the ring gear $R_1$ of the single planetary gear unit 30 via the first clutch $C_1$. Furthermore, the same is transmitted to the ring gear $R_2$ of the dual planetary gear unit 31 via the third clutch $C_0$. Therefore, the elements of the two planetary gear units 30 and 31 are integrally rotated so that the rotation, which is the same speed as that of the input shaft 29, is transmitted from the carrier CR to the counter drive gear 32. The rotation of the counter drive gear 32 is combined with the directly connected state of the U/D mechanism portion 25 so that the four speed output, which is the same rotation speed as that of the input shaft 29, is obtained from the output pinion 36.

The fifth speed state (5TH) in the D-range can be established in such a manner that the third solenoid S3 is turned off in the fourth speed state so that it is brought to the oil supply state. As a result, the 4-5 shift valve 16 is switched to the upper portion, causing the first clutch hydraulic servo $C_1$ to be drained via the drain port. Furthermore, the line pressure of the port D of the manual valve 10 is supplied to the first brake hydraulic servo $B_1$ via the oil passages Dr and Dn so that the first brake $B_1$ is engaged.

At this time, the rotation of the input shaft 29 is transmitted to the ring gear $R_2$ of the dual planetary gear unit 31 via the third clutch $C_0$. Since the sun gear S has been stopped in this state, the carrier CR rotates at high speed while idly rotating the ring gear $R_1$ of the single planetary gear unit 30 in an acceleration manner. The above-described high speed rotation is, as a O/D (Over Drive), transmitted to the counter drive gear 32. The O/D rotation acts together with the U/D mechanism portion 25 which has been brought to the directly connected state so that the fifth speed is established as the overall output of the automatic transmission 21.

In the case where the fail-safe control is performed during the above-described D-range driving, the first solenoid valve S1 is turned off so that it is brought to a drain state, the second solenoid valve S2 is turned off so that it is brought to an oil supply state and the third solenoid valve S3 is turned off so that it is brought to an oil supply state. Furthermore, the 1-2 shift valve 11 and the 3-4 shift valve 12 are brought to the lower half positions, while the 2-3 shift valve 13 and the 4-5 shift valve 16 are brought to the upper half positions. As a result, each of the clutches $C_0$, $C_1$ and $C_2$ are released, causing the N-range state to be established.

When the shift lever 101 is moved to the groove 109a, the fourth speed driving range is selected. At this time, the first clutch $C_1$, the third clutch $C_0$, the fourth clutch $C_3$ and the second brake $B_2$ are engaged, similar to the fourth speed state in the D-range. As a result, the fourth speed is established. In the case of the fail-safe control, the N-range state is established similarly to the above-described case. At this time, in the manual valve 10, the spool is shifted to a position at which the S-range pressure is generated as described above.

When the shift lever 101 is moved to the groove 106a, the driving range is selected.

The on/off states of each of the solenoid valves becomes the same as in the third speed state in the D-range. Therefore, each of the first clutch $C_1$, the fourth clutch $C_3$, the first brake $B_1$ and the second brake $B_2$ is engaged, causing the third speed state to be established. At this time, the hydraulic pressure from the port S of the manual valve 10 is supplied to the left control oil chamber of each of the 3-4 shift valve 12 and the 4-5 shift valve 16 via the oil passage Sa so that the 3-4 shift valve 12 and the 4-5 shift valve 16 are fixed to the lower half positions. Therefore, shifting to the fourth speed state and the fifth speed state can be prevented.

At this time, in the fail-safe control, the first solenoid valve S1, the second solenoid valve S2 and the third solenoid valve S3 are turned off. However, the state of the engagement/release of each of the clutches and the brakes is the same as in the third speed in the D-range.

When the shift lever 101 is moved to the groove 108a, the second speed driving range is selected. At this time, in the manual valve 10, the spool is shifted to the position at which the L-range pressure is provided as well as the S-range pressure.

The on/off state of each of the solenoid valves becomes the same as that at the second speed state in the D-range. Therefore, the first clutch $C_1$, the first brake $B_1$ and the second brake $B_2$ are engaged, causing the second speed to be established. However, the hydraulic pressure from the port L of the manual valve 10 is supplied to the left control oil chamber of the 2-3 shift valve 13 via the oil passages 1a, 1b and 1c, causing the 2-3 shift valve 13 to be fixed to the lower half position. Therefore, shifting to the third speed is prevented.

When the fail-safe control state is established, the first solenoid valve S1, the second solenoid valve S2 and the third solenoid valve S3 are turned off. However, the engagement/release state of each of the clutches and the brakes becomes the same as in the second speed driving in the D-range.

When the shift lever 101 is mived to the groove 105a, the first speed is selected. At this time, in the manual valve 10, the spool is similarly shifted to the position at which the L-range pressure is generated.

The on/off state of each of the solenoid valves becomes the same as in the first speed in the D-range. Therefore, both the first clutch $C_1$ and the fourth brake $B_4$ are engaged, causing the first speed state to be established. Similarly, the hydraulic pressure from the port L of the manual valve 10 causes the third brake $B_3$ to be engaged via the oil passages 1a, 1f, 1g, 1h, 1i and 1j. Therefore, the 1st engine brake, which cannot be obtained in the first speed in the D-range, can be obtained. The hydraulic pressure from the port L of the manual valve 10 is supplied to the left control oil chamber of the 2-3 shift valve 13 via the oil passages 1a, 1b and 1c. As a result, 2-3 shift valve 13 is fixed to the lower half position. Therefore, shifting to the third speed can be prevented.

When the fail-safe control state is established at this time, the first solenoid valve S1, the second solenoid valve S2 and the third solenoid valve S3 are turned off. However, the same engagement/release states for each of the clutches and the brakes as in the second speed driving in the D-range are established.

No hydraulic pressure is supplied from the manual valve 10 to the groove 110a (see FIG. 1) in the N and P ranges. In this state, the first solenoid valve S1 is turned on so that it is brought to the oil supply state, the second solenoid valve S2 is turned on so that it is brought to the drain state and the third solenoid valve S3 is turned on so that it is brought to the drain state. Therefore, the 1-2 shift valve 11 and the 3-4 shift valve 12 are positioned in the upper half positions, while the 2-3 shift valve 13 and the 4-5 shift valve 16 are positioned in the lower half positions. As a result, the line pressure from the oil passage La is supplied to the fourth brake hydraulic servo $B_4$ via the oil passage Le.

When the driving range is switched from the N-range to the R-range and in the case where the vehicle is stopped or driving at a first speed (7 km/h or slower), the second clutch $C_2$ is connected and as well as the third brake (1st and reverse) $B_3$ is operated. As a result, the rotation of the input shaft 29 is transmitted to the sun gear S via the second clutch $C_2$. The thus established state causes the carrier CR to be rotated reversely while reversely rotating the ring gear $R_1$ of the single planetary gear unit 30 since the ring gear $R_2$ of the dual planetary gear unite 31 is fixed by the action of the third brake $B_3$. The reverse rotation of the carrier CR is transmitted from the counter drive gear 32 to the U/D mechanism portion 25 which has been brought to the U/D state.

When the driving range is switched from the N-range to the R-range and in the case where the vehicle is driven at a speed exceeding a predetermined speed (7 km/h or slower), the first solenoid valve S1 is turned on so as to fix the reverse control valve in the upper half position. As a result, the third brake $B_3$ is released and, as a result, an undesirable shift to the R-range during driving can be prevented.

Figure 22:
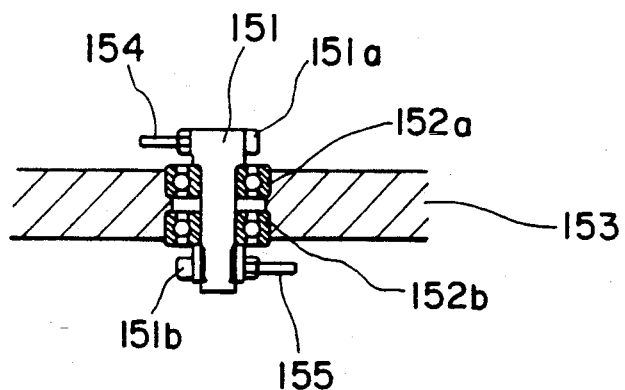
FIG. 22 is a partial cross-sectional view illustrating support of the rack & pinion.

A rack & pinion type manual valve switching action generation means will be described with reference to FIG. 21 and 22.

FIG. 21 illustrates the state of a rack & pinion in each of the driving ranges and gear ratios. More specifically, FIG. 21 (A) illustrates its state in the P-range, FIG. 21 (B) illustrates its state in the R-range, FIG. 21 (C) illustrates its state in the N-range, FIG. 21 (D), 21 (F), 21 (I) and 21 (L) illustrate its state in the intermediate position, FIG. 21 (E) illustrates its state in the low speed, FIG. 21 (G) illustrates in state in second speed, FIG. 21 (H) illustrates its state in third speed, FIG. 21 (J) illustrates its state in fourth speed, FIG. 21 (K) illustrates its state in fifth speed, and FIG. 22 illustrates the support for the rack & pinion.

Referring to the drawings, a pinion 151 has engaging teeth 151 a and 151b at opposite ends thereof, the pinion 151 being rotatably secured to a securing member 153 by bearings 152a and 152b. Furthermore, there is provided a manual valve linkage member 154 having a rack portion 154a on its side whereby the manual valve linkage member 154 always engages to one of the engaging teeth 151a.

On the other hand, a shift lever linkage member 155 is disposed in such a manner that it is connected to the lower end portion of the shift lever 101 so as to be able to move in synchronization with the movement of the shift lever 101. The shift lever linkage member 155 has a plurality of rack portions which can be engaged to the above-described engaging teeth 151b in acccordance with the selection of the range or the gear ratio.

That is, the shift lever linkage member 155 has rack portions 156 and 157 having the teeth facing right and rack portions 158 and 159 having the teeth facing left. The rack portions 156, 157, 158 and 159 are disposed at different positions in the right and the left directions so as to correspond to the lateral movement of the shift lever 101.

In the above-described rack & pinion type manual valve switching action generation means, the shift lever 101 is able to be positioned at the second pattern shift positions. The engaging teeth 151b are engaged to the rack portion 156 when the shift lever 101 is moved in the groove 105b (see FIG. 4). The same is engaged to the rack portion 158 when the shift lever 101 is moved in the groove 106b. The same is engaged to the rack portion 157 when the shift lever 101 is moved in the groove 109b. The same is engaged to the rack portion 159 when the shift lever 101 is moved in the groove 107b. When the shift lever 101 is moved in either of the grooves 110b and 108b, the engagement of the rack & pinion is released. Reference numeral 161 represents a pattern drawn by the lower end portion of the shift lever 101 when the shift lever 101 is moved, the pattern 161 having 180° point symmetry with the second pattern (see FIG. 4).

The above-described structure may be arranged in such a manner that the gear ratio of each of the engaging teeth 151a and 151b is made different whereby the extent of movement of the manual valve linkage member 154 and that of the shift lever linkage member 155 are different from each other.

That is, the stroke of the manual valve is determined in accordance with the characteristics of the automatic transmission mechanism. The above-described stroke must be provided by movement of the shift lever 101, meaning that the stroke of the knob portion of the shift lever 101 will be large. Therefore, by making the gear pitches of the teeth 151a and 151b different will allow the manual valve to be satisfactorily moved by moving the knob portion of the shift lever 101 by a short stroke.

The above-described manual valve linkage member 154 is connected to the manual valve via a linkage 162. The hydraulic pressure circuit for the automatic transmission for a vehicle which employs the rack & pinion type manual valve switching action generation means is structured similar to the hydraulic pressure circuit for the automatic transmission for a vehicle which employs the plate cam type manual valve switching action generation means. Also the control operation is similar to that of the hydraulic pressure circuit for the automatic transmission for a vehicle which employs the plate cam type manual valve switching action generation means.

Figure 23:
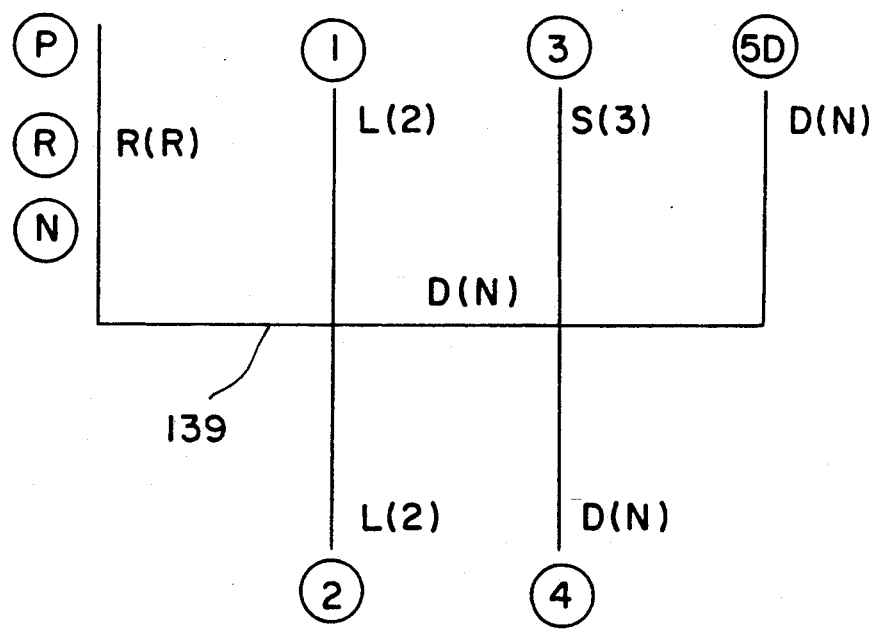
FIG. 23 is the shift pattern of the shift lever in the case of a rack & pinion type manual valve switching action generation means.
Figure 24A:
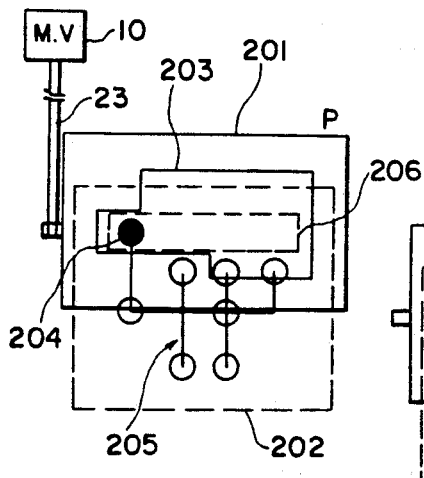
FIG. 24 illustrates the state of the plate type manual valve switching action generation means in the various ranges and gear ratios.
Figure 24B:
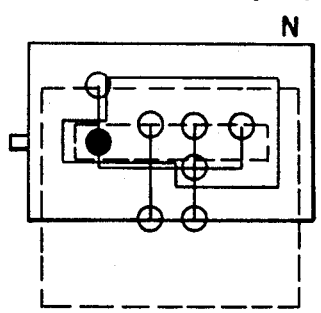
Figure 24C:
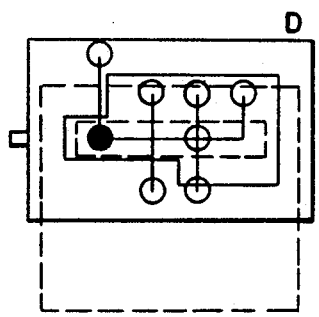
Figure 24D:
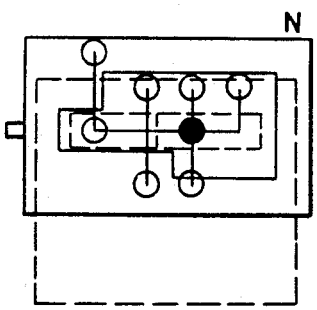
Figure 24E:
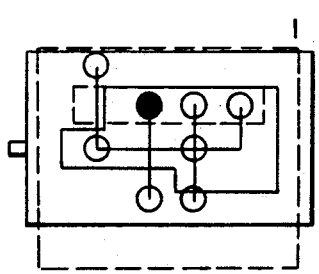
Figure 24F:
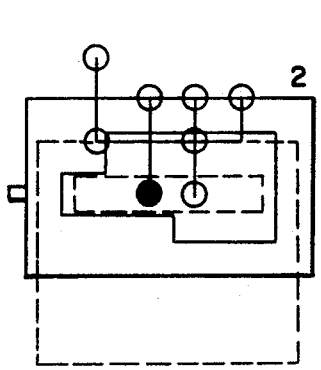
Figure 24G:
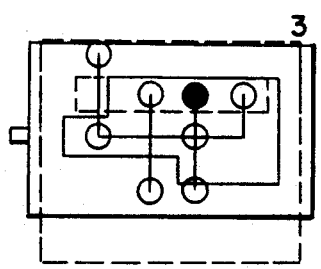
Figure 24H:
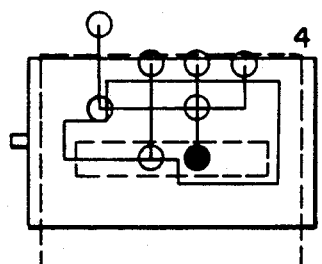
Figure 24I:
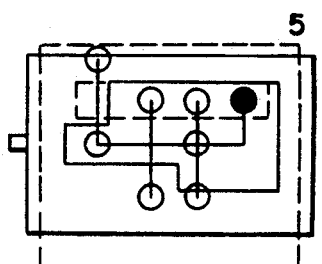

FIG. 23 illustrates the shift lever pattern of the rack & pinion type manual valve switching action supplied means.

As shown in the drawing, the manual valve supplied pressure at each of the shift positions and the ranges and gear ratios at the time of the fail-safe control mode are the same as those shown in FIG. 17 (A). The difference lies in only that the configuration is changed to the second pattern. The operation of the hydraulic pressure circuit and that of the automatic transmission are the same as those of the plate cam type manual valve switching action generation means (see FIGS. 19 and 20).

Next, a plate type manual valve switching action generation means will be described with reference to FIGS. 24 and 25.

FIG. 24 illustrates the plate type manual valve switching action generation means at the various ranges and gear ratios. More specifically, FIG. 24 (A) illustrates its state in the P-range, FIG. 24 (B) illustrates its state in the N-range, FIGS. 24 (C) and 24 (D) illustrate its state in the intermediate position, FIG. 24 (E) illustrates its state in the first speed, FIG. 24 (F) illustrates its state in the second speed, FIG. 24 (G) illustrates its state in the third speed, FIG. 24 (H) illustrates its state in the fourth speed and, FIG. 24 (I) illustrates its state in the fifth speed. FIG. 25 illustrates the mechanical structure of the manual valve switching action generation means. FIG. 25 (A) is a plan view of the manual valve switching action generation means in the first speed, FIG. 25 (B) is a side elevational view of the same in the first speed, FIG. 25 (C) is a plan view of the same in the N-range, FIG. 25 (D) is a side elevational view of the same in the N-range, FIG. 25 (E) is a plan view of the same in the second speed, and FIG. 25 (F) is a side elevational view of the same in the second speed.

In the plate type manual valve switching action generation means, the shift lever 101 can be moved to the positions of the second shift pattern shown in FIG. 4.

Referring to FIGS. 24 and 25, reference numeral 201 represents a first plate which linearly moves in accordance with the movement of the shift lever 101 and 202 represents a second plate for returning the first plate 201 to the reference position The first plate 201 has an opening 203 for moving the manual valve with a rectilinear motion when the shift lever 101 moves in the groove 103b (see FIG. 4). As illustrated, the opening 203 comprises a narrow position for causing the manual valve to follow the movement of the shift lever 101 and a wide portion for causing the same not to follow the movement of the shift lever 101.

Reference numeral 204 represents a drive point which comes in contact with the edge of the opening 203 formed in the first plate 201 when the shift lever 101 has been moved in the groove 103b so that the first plate 201 is moved, the drive point 204 being moved in accordance with a pattern designated by reference numeral 205. In this case, the pattern 204 is arranged similar to the structure of the second pattern for the shift lever 101.

The second plate 202 has an elongated opening 206 for the purpose of upwards moving the second plate 202 so as to return it to the reference position when the shift lever 101 is upwards moved after the first plate 201 has operated in accordance with the downward movement of the shift lever 101. Therefore, the opening 206 is arranged to have an elongated shape of narrow width.

A securing portion 210 is formed at the top end portion of the first plate 201 as shown in FIG. 24 for the purpose of upwards moving the first plate 201 by the second plate 202. The securing portion 210 comes in contact with a top end contact portion 211 when the second plate 202 is upwards moved in accordance with the movement of the shift lever 101 so that the securing portion 210 is moved upwards. FIG. 25 (E) illustrates the shift lever 101 at the second speed position. The above-described securing portion 210 and the contact portion 211 are positioned in contact with each other from the above-described state shown in FIG. 25 (E) to the state where the shift lever 101 is at the N-range position shown in FIG. 25 (C). When the shift lever 101 is then moved to the first speed position, the engagements of the second plate 202 and the first plate 202 are released. After this, the first plate 201 is not moved.

In order to release the engagement between the second plate 202 and the first plate 201, a guide groove 212 is formed in the second plate 202. As a result, the second plate 202 is inclined as shown in FIG. 25 (D) after the second plate 202 has been moved upwards to a predetermined position, causing the above-described contact portion 211 to be released from the securing portion 210.

FIG. 26 illustrates the shift positions of the plate type manual valve switching action generation means.

As described above, when the shift lever 101 has been shifted in accordance with the second pattern, the range pressures of the manual valve designated by symbols disposed in the vicinity of the encircled symbols are providing corresponding to the encircled shift positions.

Similarly to the embodiments having the plate cam type and the rack & pinion type manual valve switching action generation means, the intermediate position 139, which does not constitute any of the shift positions is arranged to be the D-range state. When the shift lever 101 is placed at the intermediate position 139, the vehicle can be driven at the automatic transmission mode.

In order to prevent the undesirable selection of the D-range by movement of the shift lever 101 to the intermediate position 139 in the case where the intent is to change gear ratios, there is provided means for determining whether or not a driver is touching the shift knob of the shift lever 101.

In the case where the solenoid valves or the like for selecting any of the gear ratios cannot work as desired due to a failure of the control device or noise, fail-safe control is performed. In this case, the parenthesized gear ratios disposed to the side of the symbols which illustrate the manual valve positions shown in FIG. 26 are established. Furthermore, as shown in the drawing, the speed state is shifted to the N-range when the vehicle is being driven at the first speed, the third speed or the fifth speed, the same is shifted to the second speed when the vehicle is being driven at the second speed, the same is shifted to the third speed when the vehicle is being driven at the forth speed and the same is shifted to the R-range when the vehicle is being driven at the reverse mode.

The manual valve switching action generation means constituted like this is connected to the manual valve 10 via a linkage 213 (see FIG. 24). As a result, the manual valve 10 can be operated when the shift lever 101 is moved in accordance with the second pattern. Since the first and the second plates 201 and 202 are arranged to be able to move in only the longitudinal direction of the vehicle, the width of the manual valve switching action generation means can be reduced. As a result, overall size of the center-console can be reduced.

The automatic transmission for a vehicle which employs the thus constituted manual valve switching action generation means is controlled by the hydraulic pressure circuit shown in FIG. 19 similar to that provided for the embodiments having the plate cam type and the rack & pinion type manual valve switching action generation means.

In accordance with the range selected by the manual valve 10, the first to the fourth solenoids S1, S2, S3 and S4 of the hydraulic pressure control circuit 40 operate in accordance with the operation chart shown in FIG. 27. As a result, each of the clutches $C_0$ to $C_3$, the brakes $B_1$ to $B_4$ and the one-way clutches $F_0$ to $F_3$ operate in a predetermined manner. Therefore, each of the gear ratios from the first speed to the fifth speed in each of the driving ranges P, R, D, S and L can be established.

That is, when a driver operates the shift lever 101 to move it to the groove 104b in the second pattern, the D-range is selected.

In the first speed state (1ST) in the D-range, the first solenoid valve S1 is turned on so that it is brought to the oil supply state, the second solenoid valve S2 is turned on so that it is brought to the drain state and the third solenoid valve S3 is turned on so that it is brought to the drain state. Therefore, the 1-2 shift valve 11 and the 3-4 shift valve 12 are positioned in the upper half positions. Furthermore, the 2-3 shift valve 13 and the 4-5 shift valve 16 are positioned in the lower half positions.

In this state, the line pressure from the port D of the manual valve 10 is supplied to the first clutch hydraulic servo $C_1$ via the oil passages Da and Db, the oil passage Dc of the 4-5 shift valve 16 and the oil passage Dd. In addition, the line pressure $P_L$ of the line pressure oil passage La is supplied to the fourth brake hydraulic servo $B_4$ via the port of the 2-3 shift valve 13 and the oil passage Le. As a result, in the automatic transmission 21, the first clutch $C_1$ is connected and as well as the fourth brake $B_4$ is operated.

Furthermore, the third brake $B_3$ is always engaged at the first speed, causing the engine braking function to be intensified.

At this time, the rotation of the input shaft 29 is transmitted to the ring gear $R_1$ of the single planetary gear unit 30 via the first clutch $C_1$. In this state, since the rotation of the ring gear $R_2$ of the dual planetary gear unit 31 is stopped by the second one-way clutch $F_2$, the common carrier CR is rotated in the forward direction in a decelerated manner while idly and reversely rotating the sun gear S. The above-described rotation is transmitted from the counter drive gear 32 to the counter driven gear 35 of the U/D mechanism portion 25. In the U/D mechanism portion 25, the fourth brake $B_4$ and the fourth one-way clutch $F_3$ are engaged so that both of the four speed automatic transmission mechanism portion 23 in the low speed state and the U/D mechanism portion 25 are operated together. As a result, the first speed is established as the overall output of the automatic transmission 21.

Furthermore, in the second speed state (2ND), the third speed state (3RD), the fourth speed state (4TH) and the fifth speed state (5TH) in the D-range, the operations are the same as those of the automatic transmission for a vehicle having the plate cam type and the rack & pinion type manual valve switching action generation means.

In the case where fail-safe control is performed in the above-described D-range driving, the first solenoid valve S1 is turned off so that it is brought to the drain state, the second solenoid valve S2 is turned off so that it is brought to the oil supply state, the third solenoid valve S3 is turned off so that it is brought to the drain state. Therefore, the 1-2 shift valve 11 and the 3-4 shift valve 12 are positioned in the lower half positions and the 2-3 shift valve 13 and the 4-5 shift valve are positioned in the upper half positions. As a result, each of the clutches $C_0$, $C_1$ and $C_2$ is released, causing the N-range to be established.

When the shift lever 101 is then moved to the groove 108$b$ formed in the guide plate 102 (see FIG. 4), the driving range becomes the fifth speed, similar to the fifth speed in the D-range.

In this case, in the fail-safe control, the first solenoid valve S1, the second solenoid valve S2 and the third solenoid valve S3 are turned off and each of the clutches and the brakes is brought to the same engagement/release state as in the N-range.

When the shift lever 101 is then moved to the groove 110$b$ formed in the guide plate 102 (see FIG. 4), the fourth speed is selected. In this state, since the manual valve 10 is placed to the S-range position, the S-range pressure is generated as well as the D-range pressure.

As a result, similarly to the fourth speed state in the D-range, the first clutch $C_1$, the third clutch $C_0$, the fourth clutch $C_3$ and the second brake $B_2$ are engaged so that the fourth speed state is established. At this time, the hydraulic pressure is supplied to the left control oil chamber of the 4-5 shift valve 16 via the oil passage Sa. As a result, the 4-5 shift valve 16 is maintained at the lower half positions, preventing shifting to the fifth speed.

In the case where fail-safe control is performed in the fourth speed driving, the first solenoid S1 is turned off so that it is brought to the drain state, the second solenoid valve S2 is turned off so that it is brought to the oil supply state and the third solenoid S3 is turned off so that it is brought to the oil supply state. Therefore, the 1-2 shift valve 11 and the 4-5 shift valve 16 are placed at the lower half positions. Furthermore, the 2-3 shift valve 13 and the 3-4 shift valve are moved to the upper half positions. In addition, the third clutch $C_0$ is released and the first brake $B_1$ is engaged so that the third speed is established.

When the shift lever 101 is moved to the groove 107$b$, the third speed is selected. At this time, the spool of the manual valve 10 is moved to the position at which the D-range pressure is provided.

Each of the solenoid valves is turned on/off similar to the third speed state in the D-range. Therefore, the first clutch $C_1$, the fourth clutch $C_3$, the first brake $B_1$ and the second brake $B_2$ are engaged so that the third speed is established.

When fail-safe control is performed in this state, the first solenoid valve S1, the second solenoid valve S2 and the third solenoid valve S3 are turned off and each of the clutches and the brakes is brought to the same engagement/release state as in the N-range.

When the shift lever 101 is moved to the groove 109$b$, the second speed is selected. At this time, the spool of the manual valve 10 is moved to the position at which the L-range pressure is generated as well as the S-range pressure.

The on/off state of the solenoid valves S1, S2 and S3 is the same as in the second speed in the D-range. Therefore, the first clutch $C_1$, the first brake $B_1$, the second brake $B_2$ and the fourth brake $B_4$ are engaged so that the second speed is established. However, the hydraulic pressure from the port L of the manual valve 10 is supplied to the left control oil chamber of the 2-3 shift valve 13 via the oil passages 1$a$, 1$b$ and 1$c$, causing the 2-3 shift valve 13 to be held in the lower half positions. As a result, shifting to the third speed is prevented.

When fail-safe control is performed in this state, the first solenoid valve S1, the second solenoid valve S2 and the third solenoid valve S3 are turned off and each of the clutches and the brakes is brought to the same engagement/release state as in the second speed state in the D-range.

When the shift lever 101 is moved to the groove 106$b$, the first speed is selected. At this time, the spool of the manual valve 10 is moved to the position at which the D-range pressure is provided.

The on/off state of each of the solenoid valves S1 to S3 becomes the same as in the first speed in the D-range. Therefore, the first clutch $C_1$, the third brake $B_3$ and the fourth brake $B_4$ are engaged so that the first speed state is established.

At this time, when fail-safe control is performed, the first solenoid valve S1, the second solenoid valve S2 and the third solenoid valve S3 are turned off. In this state, each of the clutches and the brakes are brought to the same engagement/release state as in the N-range.

In the N, R and P-range in the groove 105$b$ shown in FIG. 4, the operation is the same as that of the plate cam type and rack & pinion type.

As described above, in the automatic transmission which employs the plate cam type, the rack & pinion type or the plate type manual valve switching action generation means, the D-range may be established when the shift lever 101 is moved to the intermediate position 139 (see FIGS. 11, 17 and 23) in the case where the shift position is changed from any one of the gear ratios to another gear ratio.

Therefore, if a driver wants to employ the automatic transmission mode as an alternative to the manual transmission mode, the necessity of moving the shift lever 101 to an automatic transmission mode position can be eliminated.

When a certain gear ratio is shifted to another gear ratio, shifting to the D-range is established since the shift lever 101, although temporarily, passes the above-described intermediate position 139.

Therefore, the structure is arranged in such a manner that the shifting to the D-range is prevented where the intent is that lever 101 be only temporarily positioned at the intermediate position 139.

Therefore, there is provided means for determining whether or not a driver is touching the shift knob of the shift lever 101. In the case where the driver is touching the shift knob, a determination is made that the driver is shifting the gear ratio. Therefore, the previous state is maintained as it is. When the hand of the driver is released from the shift knob, a determination is made as that the driver does not want to manually shift the gear ratio. Therefore, the D-range driving mode is established.

In order to make the above-described determination, a touch sensor is provided at the shift knob portion of the shift lever 101.

FIG. 28 illustrates the touch sensor of the type provided at the shift knob.

Referring to the drawing, reference numeral 301 represents a core of a shift knob. An electric wire 302 is disposed around the core 301. The electric wire 302 is formed by tin-plating a very thin copper wire. Reference numeral 303 represents a pressure conductive rubber composed of silicone rubber and metal particles and arranged in such a manner that the resistance is changed from an insulated state (several 10M Ω or more) to a conductive state (several Ω or less) when pressure is applied. Another electric wire 304 formed by tin-plating a very thin copper wire is disposed on the pressure conductive rubber 303. Furthermore, a shift knob cover 305 formed by a thin rubber plate or leather is disposed on the electric wire 304.

When a driver touches the thus constituted shift knob, the above-described pressure conductive rubber 304 is depressed so that a conductive state is established. At this time, the above-described electric wires 302 and 304 are electrically connected, causing an electric current to be passed.

FIG. 29 illustrates another example of the touch sensor provided for the shift knob.

Referring to the drawing, reference numeral 310 represents a shift knob including an electrode 311. The above-described shift knob 310 is fastened to the shift lever 101 via an elastomeric foam 312. Therefore, when a driver holds the shift knob 310 to operate the shift lever 101, the elastomeric foam 312 is compressed and the above-described electrode 311 comes into contact with a contact 313 disposed inside the shift lever 101, causing the lead wires 314 and 315 to be electrically connected.

FIG. 30 illustrates another example of the touch sensor provided for the shift knob.

Referring to the drawing, reference numeral 320 represents a shift knob formed of conductive rubber, the shift knob 320 includes a lead wire 322 mounted in an insulating body 321. When a driver touches the shift knob 320 for the purpose of operating the shift lever 101, the body of the driver serves as a conductive body, causing a switch 323 to be switched on and pass electric current.

The automatic transmission according to the present invention is arranged in such a manner that shifting to an intermediate gear ratio is performed immediately after the shift lever 101 has been moved from the highest to the lowest shift position in order to prevent the shock due to jump shifting and to prevent the deterioration in the life of the frictional engagement elements and to perform the transmission quickly.

Therefore, when an operator operates the shift lever 101 during the driving at the fifth speed, the control device is operated simultaneously with the movement of the shift lever 101 in the groove 107a so that each of the solenoid valves S1 to S3 is turned on/off to the state of the fourth speed. When the operator operates the shift lever 101 during the driving at the first speed, the control device is operated simultaneously with the movement of the shift lever 101 in the groove 105a so that each of the solenoid valves S1 to S3 is turned on/off to the state of the second speed.

Therefore, if the fifth speed is intended to be shifted to the third speed, the transmission to the third speed is always performed via the fourth speed. In addition, if the first speed is intended to be shifted to the third speed, the transmission to the third speed is always performed via the second speed.

Then, the shift control operation performed by the automatic transmission constituted like this will be described with reference to a case of a twin manual valve type manual valve switching action generation means.

FIG. 31 is a flow chart which illustrates the shift control operation performed by the automatic transmission according to the present invention.

Step 1: A signal from a switch disposed at the shift position of the shift lever 101 is read. That is, a signal denoting the combination of any of the contacts A to D, p and a to c which have been selectively turned on is read.

Step 2: It is determined whether or not the P-range has been selected, i.e. if contacts p and D are connected.

Step 3: It is determined whether or not the R-range has been selected, i.e. if contacts a and D are connected.

Step 4: It is determined whether or not the N-range has been selected, i.e. if contacts b and D are connected.

Step 5: It is determined whether or not the D-range has been selected i.e. if contacts c and A are connected.

Step 6: MSL=0 is set when the results of determinations made in steps 1–4 to are YES.

Step 7: The automatic transmission mode is established and a flag denoting it is set.

Step 8: When the result of a determination made in step 5 is NO, it is determined whether or not the fifth speed has been selected, i.e. if the contacts a and A are connected. Step 9: MSL=5 is set.

Step 10: When the result of the determination made in step 8 is NO, it is determined whether or not the fourth speed has been selected, i.e. if contacts c and B are connected.

Step 11: MSL=4 is set.

Step 12: When the result of a determination made in step 10 is NO, it is determined whether or not the third speed has been selected, i.e. if contacts a and B are connected.

Step 13: MSL=3 is set.

Step 14: When the result of a determination made in step 12 is NO, it is determined whether or not the second speed has been selected, i.e. if contacts c and C are connected.

Step 15: MSL=2 is set.

Step 16: When the result of a determination made in step 14 is NO, it is determined whether or not the first speed has been selected, i.e. if contacts a and C are connected.

Step 17: MSL=1 is set.

Step 18: In the states where MSL=1 to 5 are set, the manual transmission drive mode is established and a flag denoting this fact is set.

Step 19: When the result of a determination made in step 16 is NO, that is. when the first to fifth speed is released, it is determined whether or not the previous data is that for the fifth speed. If the result of the determination is YES, the flow advances to step 11 and MSL=4 is set.

Step 20: When the result of a determination made in step 19 is NO, that is, when the first to fifth speed is released, it is determined whether or not the previous data is that for the first speed. If the result of the determination is YES, the flow advances to step 15 and MSL=2 is set.

Step 21: It is determined whether or not the state immediately before the gear change is the N-range, that is, it is determined whether or not the set data is that for the N-range. If the state immediately before the gear change is the N-range, MSL=N is set.

Step 23: It is determined whether or not the state immediately before the gear change is the D-range. If the state immediately before the gear change is the D-range, the flow advances to Step 6 and MSL=0 is set. If it is not the D-range, the flow advances to Step 24.

Step 24: It is determined whether or not the state immediately before the gear change is the N-range. If the state immediately before the gear change is the N-range, the flow advances to Step 25.

Step 25: It is determined whether or not degree of the throttle opening is zero. If the result of this determination is YES, the N-range state is maintained as it is and the creep phenomenon is prevented.

Step 26: It is determined whether or not the touch sensor for the shift knob has been turned on. If it has been turned on, a determination is made that the driver intends to manually perform the gear change operation. Therefore, the flow advances to step 18 in which the manual transmission drive mode is established. If the same has been turned off, the flow advances to step 6 in which the automatic transmission drive mode is established.

In the above-described operation flow chart, if the flags corresponding to Step 7 and 18 are set respectively, the usual control operation of the automatic transmission is conducted.

FIG. 23 is a control operation flow chart for an automatic transmission.

Step 31: Initialization is performed.

Step 32: The number of revolutions is calculated.

Step 33: Swith input process is performed.

Step 34: Shift position input process is performed.

Step 35: Throttle opening degree is calculated.

Step 36 to 38: It is determined that the transmission and the lockup operation must be performed and the shift timing is determined. Furthermore, the lock-up duty control is performed.

Step 39: Failure detection of the lock-up solenoid is made.

Step 40: The line pressure at the time of the shifting in controlled.

Step 41 and 42: Failure detection of the shift solenoid is made and the shifting from the shift solenoid is caused to be performed.

Step 43 and 44: Failure detection of the hydraulic pressure controlled solenoid is made and the shift by the hydraulic pressure controlled solenoid is performed.

Step 45 and 47: The start and end of the shift are detected and the display is controlled so that the display is output.

It should be understood that the foregoing relates to only a preferred embodiment of the invention, and the claims are intended to cover all changes and modifications of the example of the invention herein chosen for the purposes of the disclosure, which do not constitute departures from the spirit and scope of the invention.

What we claim is:

1. An automatic transmission for a vehicle comprising:
   (a) a plurality of friction engagement elements for establishing different driving ranges and gear ratios;
   (b) a plurality of hydraulic operators for engaging and releasing said friction engagement elements;
   (c) shift lever means including:
      (i) a shift lever for manual selection by movement to any of a plurality of shift positions, said shift positions corresponding to different ranges and gear ratios; and
      (ii) restriction means for restricting the movement of the shift lever to a pattern including at least one H-shaped portion;
   (d) selecting means for selecting the range and gear ratio which corresponds to the shift position to which the shift lever is moved;
   (e) a hydraulic fluid source;
   (f) hydraulic control means including:
      (i) a manual valve having a spool for switching hydraulic pressure responsive to said movement of said shift lever;
      (ii) a plurality of solenoid valves turned on or off responsive to said selection of shift position by movement of said shift lever; and
      (iii) a plurality of shift valves changed over, responsive to the turning off or on of said solenoid valves, for selectively connecting said hydraulic fluid source to the hydraulic operators for the frictional engagement elements to establish a shift range and gear ratio; and
   (g) electronic control means for (1) generating a signal indicative of the range or gear ratio selected by the shift lever to switch said solenoid valves, and (2) establishing, responsive to movement of the shift lever to a position intermediate two of said shift positions, either a mode A wherein the previous range and gear ratio are maintained, until said shift lever is positioned at a new shift position, or an automatic transmission drive mode B, during the time the shift lever is located in the intermediate position, said electronic control means including a switch for generating a driver intent signal, said mode A or mode B being selected by said electronic control means responsive to said driver intent signal.

2. An automatic transmission for a vehicle according to claim 1, wherein said selecting means comprises:
   manual valve switching action generation means for switching the manual valve in accordance with the movement of the shift lever; and a linkage connected to the manual valve switching action generation means for transmitting the movement of the manual valve switching action generation means to the spool of the manual valve.

3. An automatic transmission for a vehicle according to claim 2, wherein said manual valve switching action generation means comprises a cam plate slidably mounted at the lower end of the shift lever,
said cam plate having a plurality of cam grooves corresponding, respectively, to said plurality of shift positions, said cam grooves guiding the lower end of the shift lever.

4. An automatic transmission for a vehicle according to claim 2, wherein said manual valve switching action generation means comprises:
(i) a shift lever linkage member acting to follow the shift lever and having a plurality of rack portions corresponding to said plurality of shift positions;
(ii) a manual valve linkage member connected to the manual valve and having at least one rack portion; and
(iii) a pinion for engaging a rack portion of each of the two linkage members.

5. An automatic transmission for a vehicle according to claim 2, said manual valve switching action generation means comprising:
(i) a first plate connected to the manual valve and having an opening into which the shift lever is inserted; and
(ii) a second plate arranged to be selectively engaged to the first plate and arranged to return the first plate to a reference position;
said opening having interconnected grooves corresponding to said plurality of shift positions.

6. An automatic transmission for a vehicle according to claim 2, wherein said manual valve switching action generation means is positioned at the lower end of the shift lever and comprises first and second operating members extending perpendicularly to each other and an L-shaped bell crank pivotally supported for swinging motion, said first operating member having a distal end connected to said bell crank, and the second operating member having a distal end connected to the manual valve via said linkage and said bell crank having a leg connected to the manual valve via said linkage.

* * * * *